United States Patent [19]

Yagasaki

[11] Patent Number: 5,847,770
[45] Date of Patent: Dec. 8, 1998

[54] APPARATUS AND METHOD FOR ENCODING AND DECODING A SUBTITLE SIGNAL

[75] Inventor: Yoichi Yagasaki, Kanagawa, Japan

[73] Assignee: Sony Corporation, Tokyo, Japan

[21] Appl. No.: 718,779

[22] Filed: Sep. 24, 1996

[30] Foreign Application Priority Data

Sep. 25, 1995 [JP] Japan .................................. 7-246278

[51] Int. Cl.$^6$ .......................... H04N 5/278; H04N 5/445
[52] U.S. Cl. .......................... 348/563; 348/564; 348/473
[58] Field of Search .................................. 348/563, 468, 348/467, 465, 473, 600, 589, 714, 718, 564, 569; H04N 5/278, 5/272, 5/262, 5/445

[56] References Cited

U.S. PATENT DOCUMENTS

| | | | |
|---|---|---|---|
| 4,614,972 | 9/1986 | Motsch et al. | 358/147 |
| 5,684,542 | 11/1997 | Tsukagoshi | 348/468 |
| 5,731,847 | 3/1998 | Tsukagoshi | 348/589 |

*Primary Examiner*—Andrew I. Faile
*Assistant Examiner*—Uyen Le

*Attorney, Agent, or Firm*—Frommer Lawrence & Haug, LLP; William S. Frommer

[57] ABSTRACT

Subtitle encoding and decoding apparatus and corresponding method are operable to encode and decode multiple subtitle signals representing multiple subtitles to be superimposed on a video image. Each received subtitle signal is encoded (in the encoding apparatus only) and stored in a buffer memory. An address list including data nodes therein is generated from the received subtitle signals wherein each data node in the address list corresponds to a respective subtitle stored in the buffer memory. Each data node includes data corresponding to the time and position at which a respective subtitle is to be superimposed on a video image, as well as buffer memory address information which identifies the location in the buffer memory at which the respective subtitle is stored. Each data node further includes pointer data that identifies another data node that corresponds to a successively positioned subtitle in the display. Appropriate write and read address control signals are generated from the data in the address list and a subtitle signal is stored to and reproduced from the buffer memory in accordance with the respective write and read address control signals. In the decoding apparatus, the read out subtitle signal is decoded before being output.

26 Claims, 21 Drawing Sheets

FIG.11C

| POINTER FOR NODE OF DATA 2 | INITIAL POINTER | | | | | |
|---|---|---|---|---|---|---|
| END POINTER | START ADDRESS | END ADDRESS | DISPLAY START TIME | DISPLAY END TIME | DISPLAY START POSITION | DISPLAY END POSITION |
| | END POINTER | | | | | |

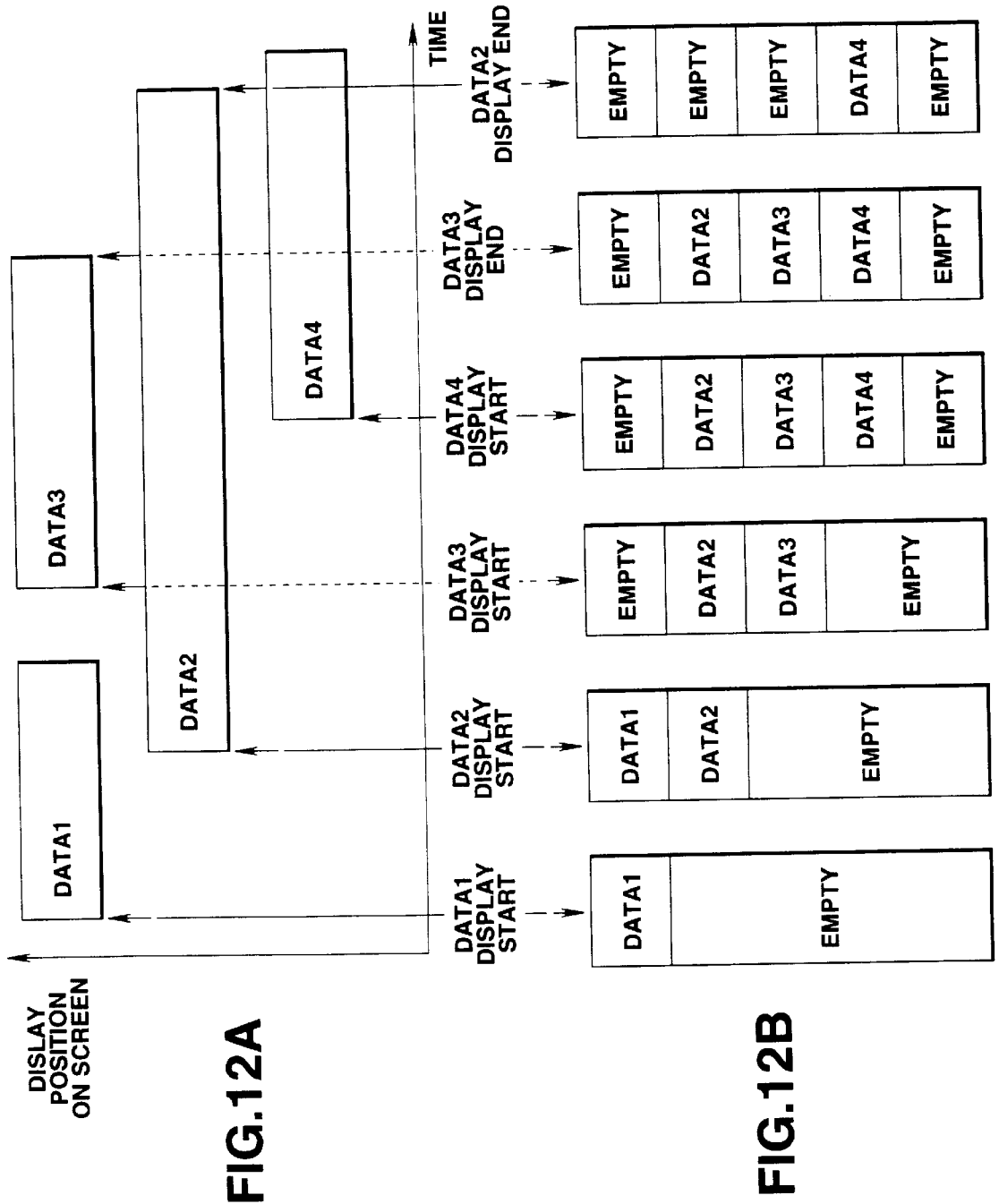

APPARATUS AND METHOD FOR ENCODING AND DECODING A SUBTITLE SIGNAL

BACKGROUND OF THE INVENTION

The present invention relates to apparatus and method for encoding and decoding a subtitle signal and, more particularly, to apparatus and method for encoding and decoding subtitle data which are operable to efficiently encode/decode and subsequently output a subtitle signal representing one or more subtitles to be displayed on a video image.

Referring to FIG. 1 of the drawings, a picture and subtitle encoding apparatus is shown and is comprised of a picture encoding apparatus 20 and a subtitle coding apparatus 26. Picture encoding apparatus 20 is comprised of an encoder unit 22 and a buffer memory 24, wherein a video image (i.e., a picture signal) is supplied to encoder unit 22, which may be an MPEG encoder, and which encodes the video signal in a manner well known in the art, and which supplies the encoded signal to buffer memory 24 which temporarily stores the encoded signal therein. The encoded signal is read from buffer memory 24 and is supplied as a "picture stream" to a multiplexer 38. Buffer memory 24 also supplies a signal representing the amount of memory remaining in the buffer (i.e., unused memory) to encoder unit 22 which encodes the video signal in a particular manner (e.g., intraframe or interframe encodes the video signal) in response thereto.

Subtitle coding apparatus 26 is comprised of a coder 28, a multiplexer 30, a buffer memory 32 and an address controller 34. A subtitle signal which represents a subtitle to be displayed on a video image, along with display time data and display position data, are supplied to coder 28 which encodes each pixel of the subtitle represented by the subtitle signal as a two-bit data code and supplies each of the data codes as a coded signal, along with the time and display position data, to multiplexer 30. As is well known, coder 28 converts each pixel of the subtitle to one of four different colors as represented by the two-bit data code. Coder 28 additionally supplies a signal representing the amount of data of the subtitle signal to multiplexer 30 and further supplies the amount of data signal, along with the coded signal and the display and position data to address controller 34. Multiplexer 30 multiplexes the supplied signals into a multiplexed coded signal and supplies the multiplexed coded signal to buffer memory 32 which stores the supplied signal therein. Address controller 34, in response to the data amount signal and the display and position data, generates appropriate write and read control signals, and supplies the write and read control signals to buffer memory 32 which stores the supplied multiplexed coded signal at a memory address as indicated in the write address control signal and reads therefrom data stored at a memory address as indicated in the read address control signal. Buffer memory 32 additionally supplies to coder 28 a buffer remaining amount signal representing the amount of unused memory remaining in the buffer so as to control the type of coding of the subtitle signal in coder 28. The coded signal stored in buffer memory 32 is read therefrom and supplied as a subtitle stream to multiplexer 30 which multiplexes the picture stream and the subtitle stream to produce a combined picture and subtitle signal. The combined signal is transmitted over a transmission path or recorded on a record medium 40 by a recording device (not shown).

The picture and subtitle coding apparatus shown in FIG. 1 further includes a system clock generator 36 which generates time information (i.e., a system clock signal) and supplies the time information to encoder unit 22, coder 28, address controller 34 and multiplexer 38, and these devices utilize the time information so that they operate in a synchronous manner.

Referring next to FIG. 2, a picture and subtitle decoding apparatus is shown as comprising a picture decoding apparatus 44 and a subtitle decoding apparatus 50, wherein the picture decoding apparatus 44 is comprised of a buffer memory 46 and a decoder unit 48, and the subtitle decoding apparatus 50 is comprised of a buffer memory 52, a demultiplexer 54, a decoder 56 and an address controller 58. The video and subtitle data (i.e., the combined picture and subtitle signal) is read from record medium 40 (or received over a transmission path) and supplied to a demultiplexer 42 which demultiplexes the supplied signal and supplies the video signal (i.e., the picture stream) to picture decoding apparatus 44 and supplies the subtitle data (i.e., the subtitle stream) to subtitle decoding apparatus 50.

The video signal supplied to picture decoding apparatus 44 is temporarily stored in buffer memory 46 before being supplied to decoder unit 48 which decodes the video data at a time as indicated by the time information supplied by a system clock generator 60. Decoder 48 decodes the video data in a manner well known in the art and supplies the decoded video signal as an output for display on a monitor (not shown).

The subtitle data supplied to subtitle decoding apparatus 50 is stored in buffer memory 52 at an address as indicated by a write address control signal supplied from address controller 58, and buffer memory 52 reads the stored subtitle data therefrom from an address as indicated by a read address control signal also supplied from address controller 58. The read-out subtitle data is supplied to demultiplexer 54 which demultiplexes the coded signal, display time and position data, and data amount information therein and supplies the coded signal (i.e., the subtitle signal) to decoder 56, supplies the display and position data to decoder 56 and to address controller 58, and supplies the data amount information also to decoder 56 and to address controller 58. Address controller 58 establishes the write and read address control signals that are supplied to buffer memory 52 from the display time, position data and the data amount information, and in response to a control signal supplied from demultiplexer 42. Decoder 56 decodes the coded subtitle signal in a manner well know in the art and supplies the decoded signal at a time as indicated by the display start and end time information as well as from the display position data and time information supplied from system clock generator 60. The decoded subtitle signal is combined with the video signal that is output from picture decoding apparatus 44 in a combining device (not shown) such that the subtitle represented by the subtitle signal is superimposed on the video image.

FIG. 3 schematically illustrates the data stored in buffer memory 52 and the superimposition of a subtitle on a video image displayed on a monitor (i.e., a screen), wherein only one subtitle is stored in buffer memory 52 and represented by "DATA 1". When only one subtitle is superimposed on a video image, such as shown in FIG. 3, buffer memory 52 of the decoding apparatus and buffer memory 32 of the encoding apparatus each operates as a FIFO (first-in-first-out) memory.

FIGS. 4 and 5 schematically illustrate when data of two subtitles are stored in buffer memory 52 and simultaneously superimposed on a video image. For example, a first subtitle, represented by "DATA 1", is displayed with the video image from a time t1 until a time t1' and is displayed at a lower portion of the image, and a second subtitle, represented by "DATA 2", is superimposed on the video image at a time t2 until a time t2' at an upper portion of the video image, such as shown in FIG. 4. Both subtitles are displayed from time t2 to time t1'. If the data "DATA 1" of the first subtitle is supplied with the video signal before the data "DATA 2" of the second subtitle is supplied, then buffer memory 52 has the data structure as shown in FIG. 5. Accordingly, when only the first subtitle is displayed (from time t1 to time t2), address controller 58 generates a read address control signal corresponding to the location in buffer memory 52 whereat DATA 1 resides. Similarly, when only the second subtitle is displayed (from time t1' to time t2'), address controller 58 generates a read address control signal corresponding to the location in buffer memory 52 whereat DATA 2 resides. However, since the second subtitle is located above the first subtitle when both subtitles are displayed (from time t2 to time t1'), it is necessary for address controller 58 to generate a read address control signal that first corresponds to the location of DATA 2 in buffer memory 52 and then to the location of DATA 1 in buffer memory 52. Thus, DATA 2 is read from buffer memory 52 before DATA 1 is read therefrom for the time period occurring between time t2 and time t1' and, thus, buffer memory 52 is not operating as a FIFO memory.

Referring next to FIGS. 6A and 6B, a schematic illustration of the data structure of buffer memory 52, as well as a schematic illustration of the times and positions at which four different subtitles are displayed. A first subtitle "DATA 1" is stored in buffer memory 52 and displayed at an upper portion of the video image, a second subtitle "DATA 2" is stored after DATA 1 in buffer memory 52 and is displayed at a middle portion of the video image at a time when the first subtitle is still being displayed. Upon termination of the display of the first subtitle, subtitle data DATA 1 corresponding thereto is erased from buffer memory 52, and a third subtitle DATA 3 is stored after DATA 2 in buffer memory 52 and displayed above the second subtitle in the video image. At this time, DATA 3 is read from buffer memory 52 before DATA 2 is read therefrom. A fourth subtitle DATA 4 subsequently is stored after DATA 3 in buffer memory 52 and DATA 3 is read from memory, then DATA 2 is read from memory, and then DATA 4 is read from memory for each frame until the termination of the display of the third subtitle DATA 3, at which time the third subtitle DATA 3 is erased from buffer memory 52, as shown. The display of the second subtitle DATA 2 then is terminated and DATA 2 is erased from buffer memory 52 and, subsequently, the display of the fourth subtitle DATA 4 is terminated and DATA 4 is erased from buffer memory 52. As can be appreciated from the foregoing description, buffer memory 52 cannot be controlled to operate as a FIFO type memory. Further, subtitle data are not consecutively stored in buffer memory 52 at each instance in time as shown in FIG. 6B. Still further, due to the complex control of buffer memory 52 and since subtitle data are not consecutively stored therein, the control of buffer memory 32 of the coding apparatus shown in FIG. 1 does not coincide with the control of buffer memory 52 of the decoding apparatus shown in FIG. 2. Thus, overflow and/or underflow of data stored in buffer memories 32 and 52 is possible, which results in the inherent limiting of the number of subtitles that can be displayed on a video image and the arrangement thereof.

OBJECTS OF THE INVENTION

Therefore, it is an object of the present invention to provide apparatus and method for encoding and decoding a subtitle signal which overcome the shortcomings of the above-described devices.

Another object of the present invention is to provide an encoding and decoding technique in which the control of a buffer memory which stores subtitle data is simplified.

A further object of the present invention is to provide apparatus for encoding and decoding a subtitle signal which include therein a respective buffer memory which is controlled to operate as a FIFO type memory device.

Various other objects, advantages and features of the present invention will become readily apparent to those of ordinary skill in the art and the novel features will be particularly pointed out in the appended claims.

SUMMARY OF THE INVENTION

In accordance with one embodiment of the present invention, apparatus and method are provided for receiving a subtitle signal which represents a subtitle to be superimposed on a video image, encoding the subtitle signal, generating an address list from the display time and display position data which are included in the subtitle signal and which represent a time and position at which the subtitle is to be superimposed on the video image, generating a write address signal, generating a read address signal in accordance with the generated address list, storing the coded subtitle signal in a memory in accordance with the write address signal, reading the stored coded subtitle signal from the memory in accordance with the read address signal, and supplying as an output signal the coded subtitle signal read from the memory.

As one aspect of the present invention, a data node is added to the address list each time a new subtitle (i.e., subtitle signal) is received, wherein the added data node includes data that corresponds to the display time and position data included in the newly received subtitle signal and also includes memory location data which represents a location in the memory at which the newly received subtitle signal is stored.

As a feature of this aspect, each data node in the address list further includes respective pointer data that identifies another data node in the address list that corresponds to a subtitle that is to be superimposed positionally after the subtitle that corresponds to the respective data node.

As a feature of this feature, read address signals are generated that correspond to each coded subtitle that is to be read from the memory in an order as indicated by the respective pointer data of each data node in the address list.

As another aspect of the present invention, a coded subtitle signal including display time data which represents an end time that is earlier than a current time and which is stored in the memory is erased therefrom only if there is no coded subtitle signals that precede this coded subtitle signal in the memory.

In accordance with another embodiment of the present invention, apparatus and method are provided for receiving a coded subtitle signal, generating an address list from the display time data and the display position data included in the coded subtitle signal, generating a write address signal, generating a read address signal in accordance with the generated address list, storing the coded subtitle signal in a memory in accordance with the write address signal, reading the stored coded subtitle signal from the memory in accordance with the read address signal, and decoding the read out coded subtitle signal to produce a decoded subtitle signal.

BRIEF DESCRIPTION OF THE DRAWINGS

The following detailed description, given by way of example and not intended to limit the present inventions solely thereto, will best be appreciated in conjunction with the accompanying drawings wherein like reference numerals denote like elements and parts, in which:

FIGS. 11A–11C schematically illustrate the data structure of an addressed list during various times at which two subtitles are displayed in accordance with the present invention;

FIGS. 12A and 12B schematically illustrate the time and position at which four subtitles are displayed on a video image and the storage thereof in a buffer memory in accordance with the present invention;

DETAILED DESCRIPTION OF CERTAIN PREFERRED EMBODIMENTS

Figure 7:
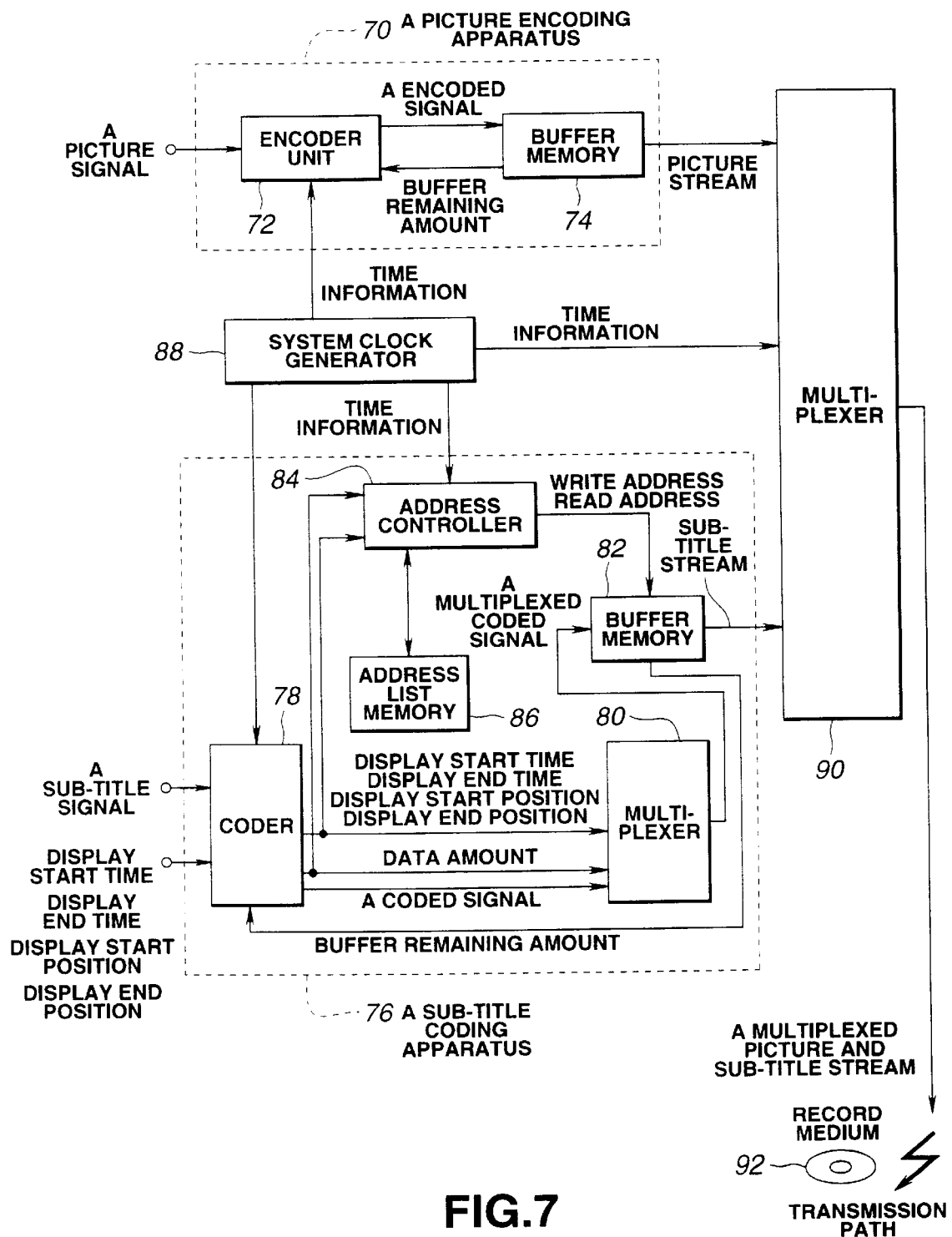
FIG. 7 is a block diagram of apparatus for encoding a picture and subtitle signal including a subtitle encoding apparatus in accordance with the present invention.

Referring now to FIG. 7 of the drawings, a block diagram of a picture and subtitle coding apparatus including a subtitle coding apparatus in accordance with the present invention is shown. The picture and subtitle coding apparatus is comprised of a picture encoding apparatus 70, which includes therein an encoder unit 72 and a buffer memory 74, and a subtitle coding apparatus, which includes therein a coder 78, a multiplexer 80, a buffer memory 82, an address controller 84 and an address list memory 86.

Figure 1:
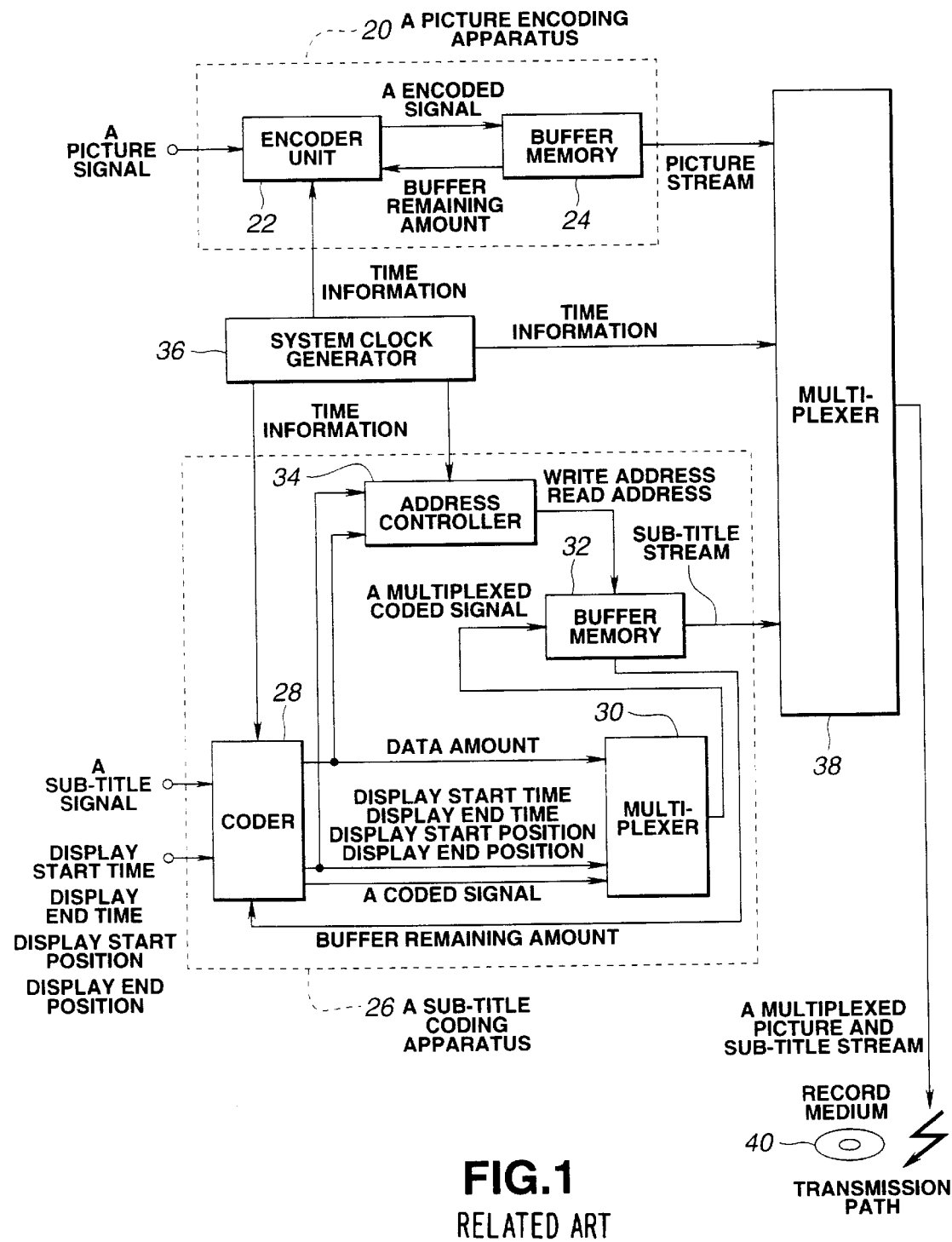
FIG. 1 is a block diagram of a picture and subtitle encoding apparatus.

Picture encoding apparatus 70 operates in a manner similar to that of picture encoding apparatus 20, previously discussed with reference to FIG. 1, and, thus, further description thereof is removed herein except where necessary for an understanding of the present invention.

A subtitle signal representing a subtitle to be superimposed on the video image is supplied to coder 78 of subtitle coding apparatus 76 which operates to encode each pixel of the subtitle into a four bit data code thus corresponding to one of 16 colors. The coded subtitle data, along with a signal indicating the amount of data in the coded signal and display time and display position data are supplied to multiplexer 80 which multiplexes the supplied signals and which supplies the multiplexed signal to buffer memory 82 which temporarily stores the multiplexed signal therein. Coder 78 further supplies the data amount signal and the time and position data to address controller 84 which generates an address list therefrom (to be discussed) and stores the address list in address list memory 86. Address controller 84 further generates write and read address control signals from the address list stored in memory 86 (also to be discussed) and supplies the write and read address control signals to buffer memory 82. Buffer memory 82 stores the multiplexed coded signal supplied thereto at a memory address therein as indicated in the write address control signal and reads data from an address as indicated in the read address control signal and supplies the read out data as a subtitle stream to multiplexer 90. Buffer memory 82 further supplies a control signal representing the amount of unused memory in the buffer to encoder 78 which, in response thereto, codes the subtitle signal in a manner well known in the art to prevent overflow or underflow of data in buffer memory 82.

System clock generator 88 supplies time information (i.e., a system clock signal) to encoder unit 72, coder 78, address control 84 and multiplexer 90 and these devices are controlled to operate in a synchronous manner. Multiplexer 90 multiplexes the picture stream signal supplied from picture encoding apparatus 70 and a subtitle stream supplied from subtitle coding apparatus 76, and supplies the multiplexed signal for transmission thereof over a transmission path or, alternatively, to a recording device (not shown) which records the multiplexed signal on a record medium 92.

Figure 2:
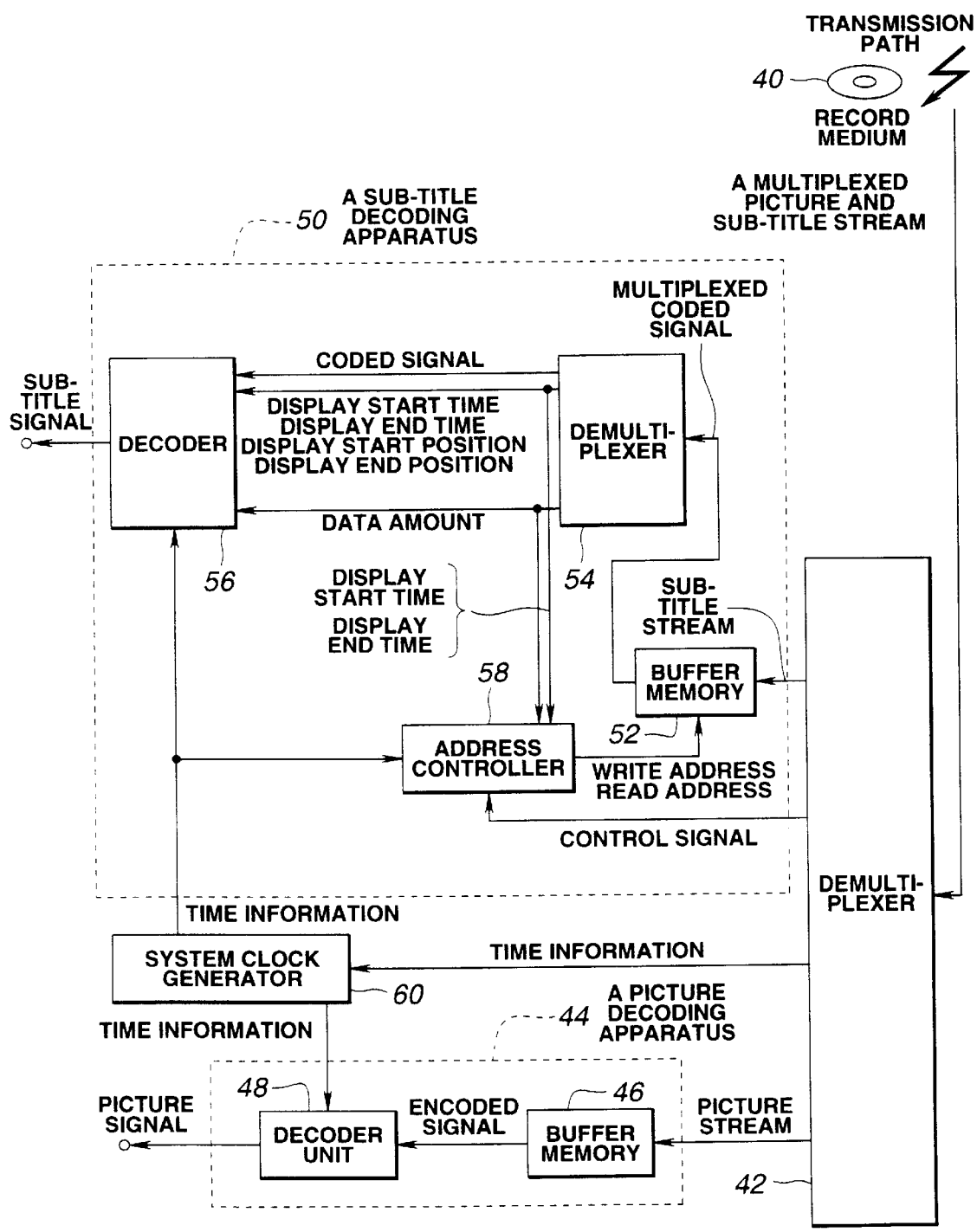
FIG. 2 is a block diagram of a picture and subtitle decoding apparatus.
Figure 3:
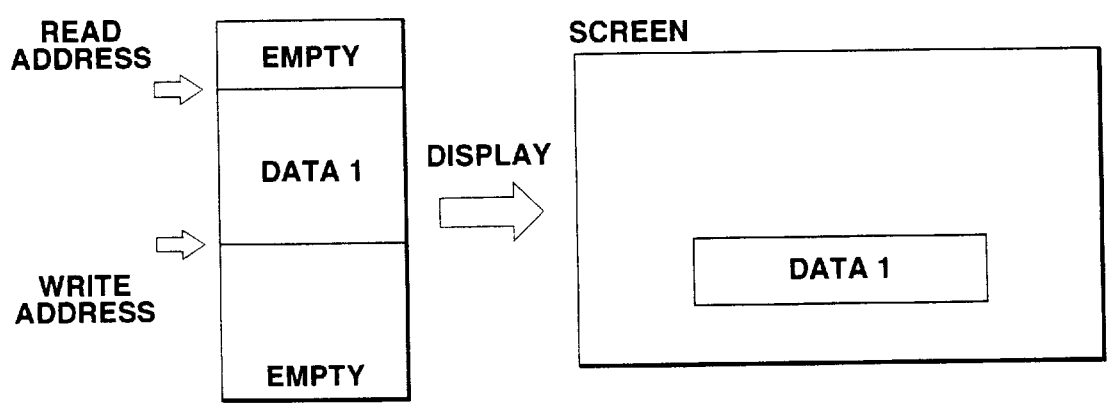
FIG. 3 schematically illustrates the storage and display of one subtitle.
Figure 8:
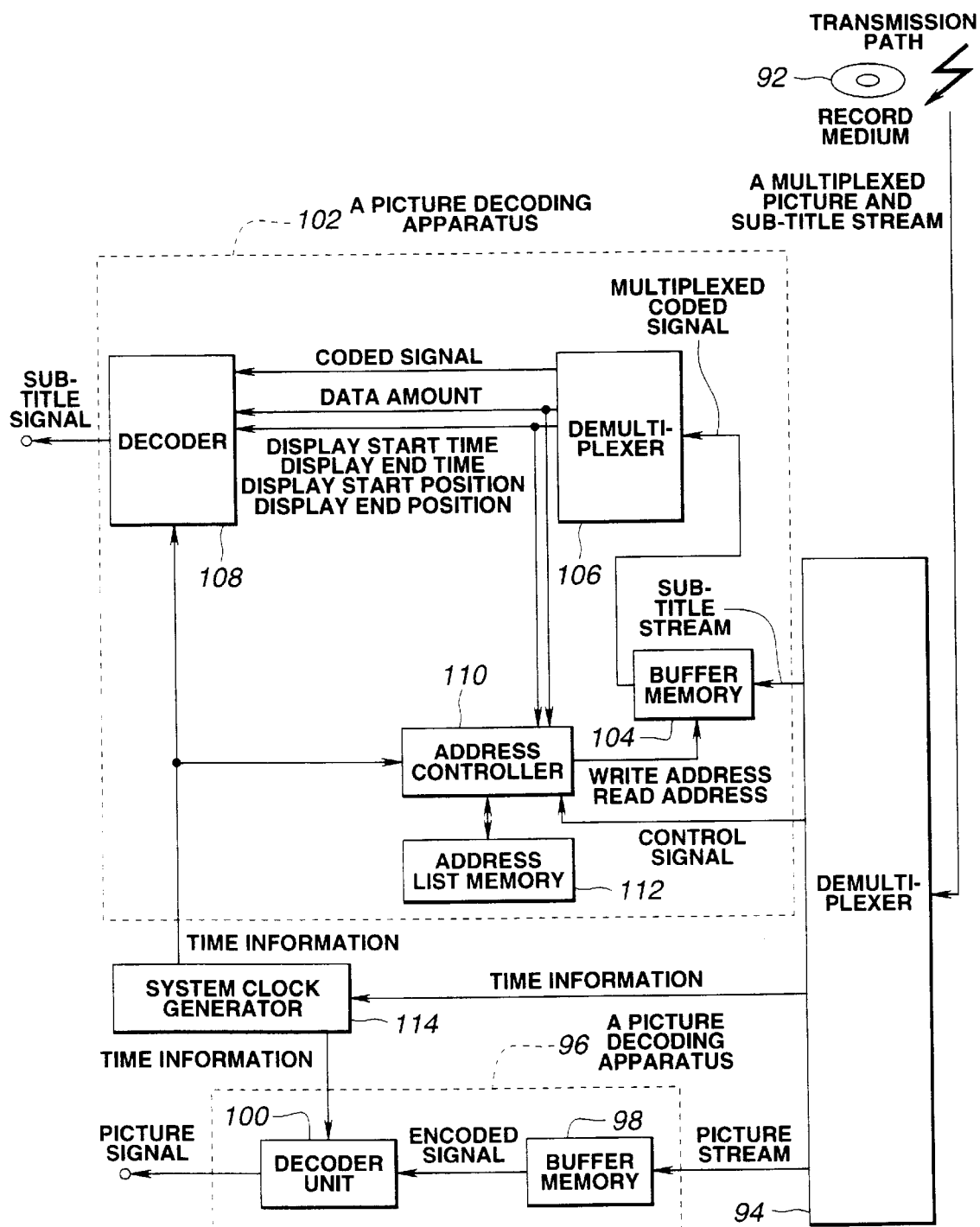
FIG. 8 is a block diagram of a picture and subtitle decoding apparatus including a subtitle decoding apparatus in accordance with the present invention.

FIG. 8 is a block diagram of a decoding apparatus which is comprised of a picture decoding apparatus 96 and a subtitle decoding apparatus 102 in accordance with the present invention. Picture decoding apparatus 96 is comprised of a buffer memory 98 and a decoder unit 100, and operates in a manner similar to that of picture decoding apparatus 44 shown in FIG. 2 and, thus, further description thereof is omitted herein except where necessary for an understanding of the present invention.

Subtitle decoding apparatus 102, in accordance with the present invention, is comprised of a buffer memory 104, a demultiplexer 106, a decoder 108, an address controller 110 and an address list memory 112. The coded multiplexed picture and subtitle signal is received over a transmission path, or alternatively, is reproduced from record medium 92 in a reproducing device (not shown), and the coded multiplexed signal is supplied to a demultiplexer 94 which demultiplexes the signal into its coded picture and coded subtitle components. The coded picture signal is supplied as a picture stream to picture decoding apparatus 96 which temporarily stores the picture stream in buffer memory 98 and decodes in decoder unit 100 the coded signal in a manner well known in the art. The decoded picture signal is supplied as an output signal at a time as controlled by a time information signal supplied from a system clock generator 114.

Demultiplexer 94 supplies the coded subtitle signal to buffer memory 104 in subtitle decoding apparatus 102 which stores the supplied signal at a memory address therein as indicated in a write address control signal supplied from address controller 110. Buffer memory 104 reads the stored subtitled data from a memory address as indicated in a read address control signal supplied from address controller 110 and supplies the read out signal to demultiplexer 106 which demultiplexes the subtitle data into its respective coded subtitle signal, data amount signal, and time and position signal components. The coded subtitle signal, data amount signal and time and position signals are supplied to decoder 108 which decodes the respectively supplied signals in a manner well known in the art and which supplies a decoded subtitle signal representing a subtitle to be superimposed on a video image at an appropriate time as indicated by the time and position data supplied thereto.

Address controller 110 generates from the supplied time and position data an address list (to be discussed) and supplies the generated address list to address list memory 112 which stores the address list therein. Address controller 110 further generates the write and read address control signals from the address list stored in memory 112 as well as from the time information supplied from system clock generator 114, and supplies the generated write and read address control signals to buffer memory 104.

The generation of an address list by both address controller 84 of the subtitle coding apparatus and address controller 110 of the subtitle decoding apparatus will now be discussed with reference to FIGS. 9, 10 and 11A–11C. However, for purposes of the present discussion, since the operation of address controllers 84 and 110 are substantially similar, the discussion herein will be directed to the operation of address controller 110, but it is understood that the functions and operations of address controller 110 also are applicable to address controller 84.

Figure 9:
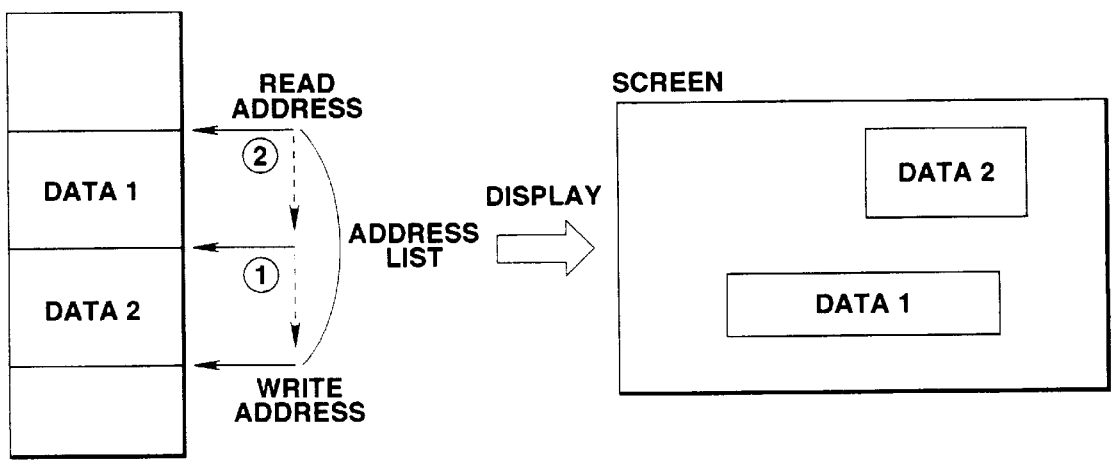
FIG. 9 schematically illustrates the storage and display of two subtitles in accordance with the present invention.
Figure 10:
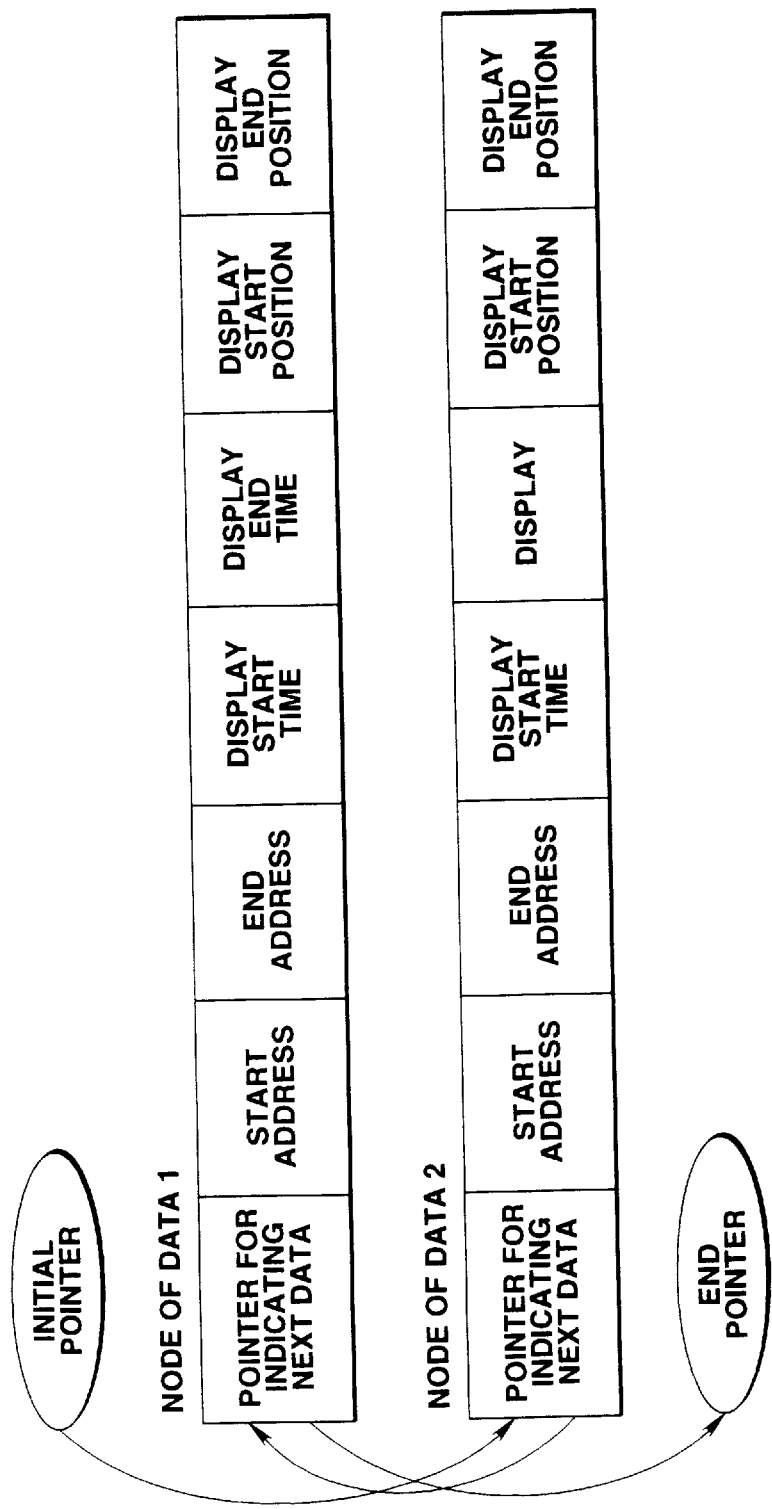
FIG. 10 schematically illustrates the data structure of an address list in accordance with the present invention.
Figure 11A:
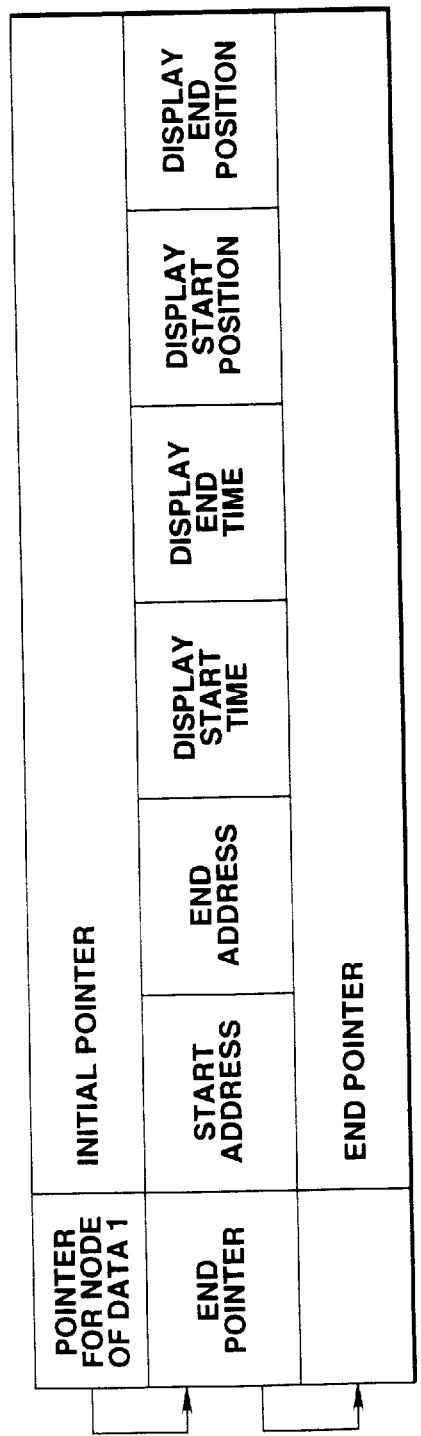
Figure 11B:
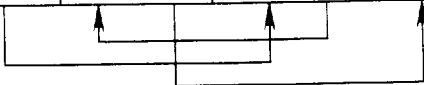

When two subtitles are supplied with the video picture, a first subtitle, represented by "DATA 1", is stored in buffer memory 104 at a first memory address therein, as shown in the left hand portion of FIG. 9. Address controller 110 generates appropriate write address control signals so that buffer memory 104 successively stores the subtitle data of the first subtitle (DATA 1) at a top memory address (or first memory address) of buffer memory 104. Upon receipt of the first subtitle data (and storage thereof in buffer memory 104), address controller 110 generates a first data "node" which contains various data including the first and last addresses (start address and end address) of buffer memory 104 at which the first subtitle DATA 1 is stored, the display start and end times at which the first subtitle is to be superimposed on the video image, and the display start and end positions at which the first subtitle is to be superimposed on the video image. The first node is illustrated in FIG. 10 as the "node of DATA 1". The DATA 1 node (as well as all other nodes, as will be seen) further includes "pointer" data which identifies (or "points" to) the node of the next subtitle to be positionally displayed (i.e., superimposed) on the video image. If only one subtitle, e.g., subtitle DATA 1, is stored in buffer memory 104, then the DATA 1 node includes a pointer that indicates that this node is the last node in the address list or, alternatively, includes a pointer that identifies (points to) an "end pointer" (or "end" node), such as shown in FIG. 11A. The end pointer represents the end of the address list. The pointer of each node may identify a particular memory address of address list memory 112 at which the successive node is located or may identify an assigned node value, for example, node 1, node 2, etc., whereat the location of a given node value in the address list is known or predetermined.

In accordance with the present invention, for each video image (e.g., field or frame) that is to be output from picture decoding apparatus 96, address controller 110 "cycles" through the address list wherein the first node of the address list is read (or pre-read) from address list memory 112, and which location may be identified by an "initial" pointer (see FIG. 11A), and based on the data of the first node (in this case, the first node represents the first subtitle DATA 1), the first subtitled data is or is not read from buffer memory 104 (as controlled by the read address control signal). That is, if the time information represents a time between the display start and end times of the first subtitle, the first subtitle is read from memory 104 from the locations therein as indicated by the start and end address data included in the node and at an appropriate time during the output of a given frame as indicated by the display start and end position data stored in the node. Thus, after a node is generated and stored in the address list corresponding to a particular subtitle stored in buffer memory 104, the node includes all of the information that is necessary to determine if and when the subtitle stored in buffer memory 104 is to be read therefrom, decoded in decoder 108 and subsequently superimposed on the video image. After the first node is processed, that is, after it is determined whether the subtitle corresponding to that node is to be read from buffer memory 104 (and the reading, if any, thereof), the next node that is identified by the pointer of the first node is read (or pre-read) from the address list stored in memory 112, and this next node then is processed. Of course, if only one subtitle is stored in buffer memory 104, then no other nodes, except perhaps an END node, exists in the address list.

A second subtitle, for example, subtitle "DATA 2", is supplied to buffer memory 104 and is stored at a location therein immediately after the first subtitle DATA 1, such as illustrated in the left hand portion of FIG. 9. A second data node, called "the DATA 2 node", is generated in address controller 110 and includes data pertaining to the start and end addresses of buffer memory 104 at which the second subtitle is stored, display start and end times at which the second subtitle is to be superimposed on the video image, and display start and end positions of the second subtitle in the video image. Still further, and in accordance with the present invention, the pointer of each node in the address list is established to reflect the read-out order of the subtitles stored in buffer memory 104 and which depends solely on the display start and end positions of each of the subtitles. That is, the pointer of the "initial node" or "initial pointer" is established (i.e., modified) to point to the second node since the second subtitle is located positionally before (i.e., above) the first subtitle in the video image, as shown in the right hand portion of FIG. 9. Thus, it is necessary to process the second node before the first node for each frame of the video picture. The pointer of the second node is established to point to the first node of the address list since the first subtitle occurs after (positionally) the second subtitle. Finally, the pointer of the first node is established (if not already) to point to the "end pointer" since the first subtitle DATA 1 is the positionally last subtitle. It is important to note that the above-discussed pointer order is established regardless of the display start and end times of each of the subtitles and, instead, is solely based on the display start and end positions of each of the subtitles. Thus, for each video frame that is output from picture decoding apparatus 96, the second node corresponding to the second subtitle DATA 2 is processed (to determine if the second subtitle is to be read from buffer memory 104, decoded and superimposed on the image) before the first node is processed since the second subtitle is positionally located on the screen before the first subtitle. FIG. 10 illustrates the data structure of the address list when the first and second subtitles DATA 1 and DATA 2, shown in FIG. 9, are stored in buffer memory 104.

Figure 4:
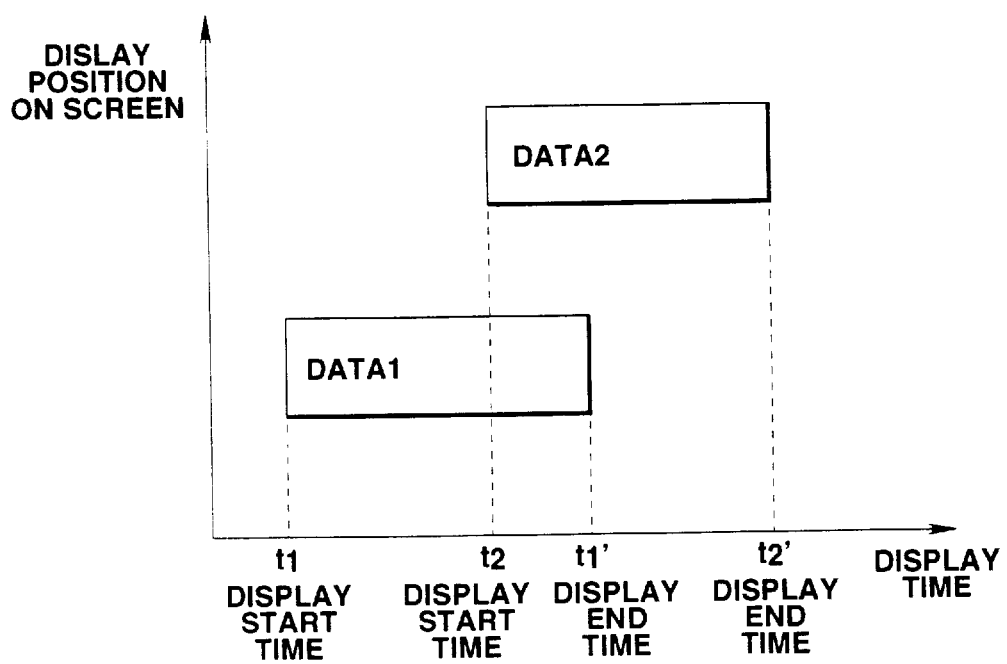
FIG. 4 schematically illustrates the time and position at which two subtitles are displayed on a video image.
Figure 5:
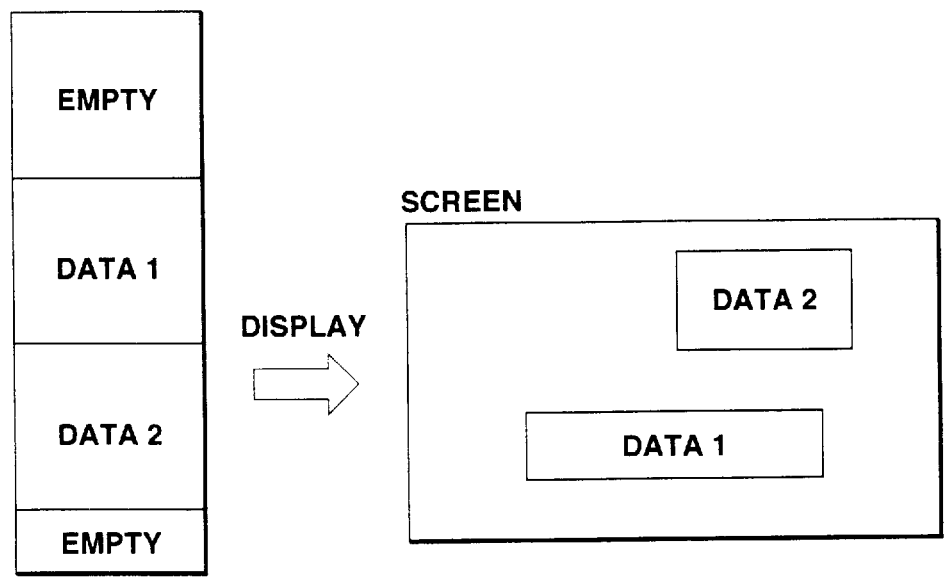
FIG. 5 schematically illustrates the storage and display of two subtitles.
Figures 6A, 6B:
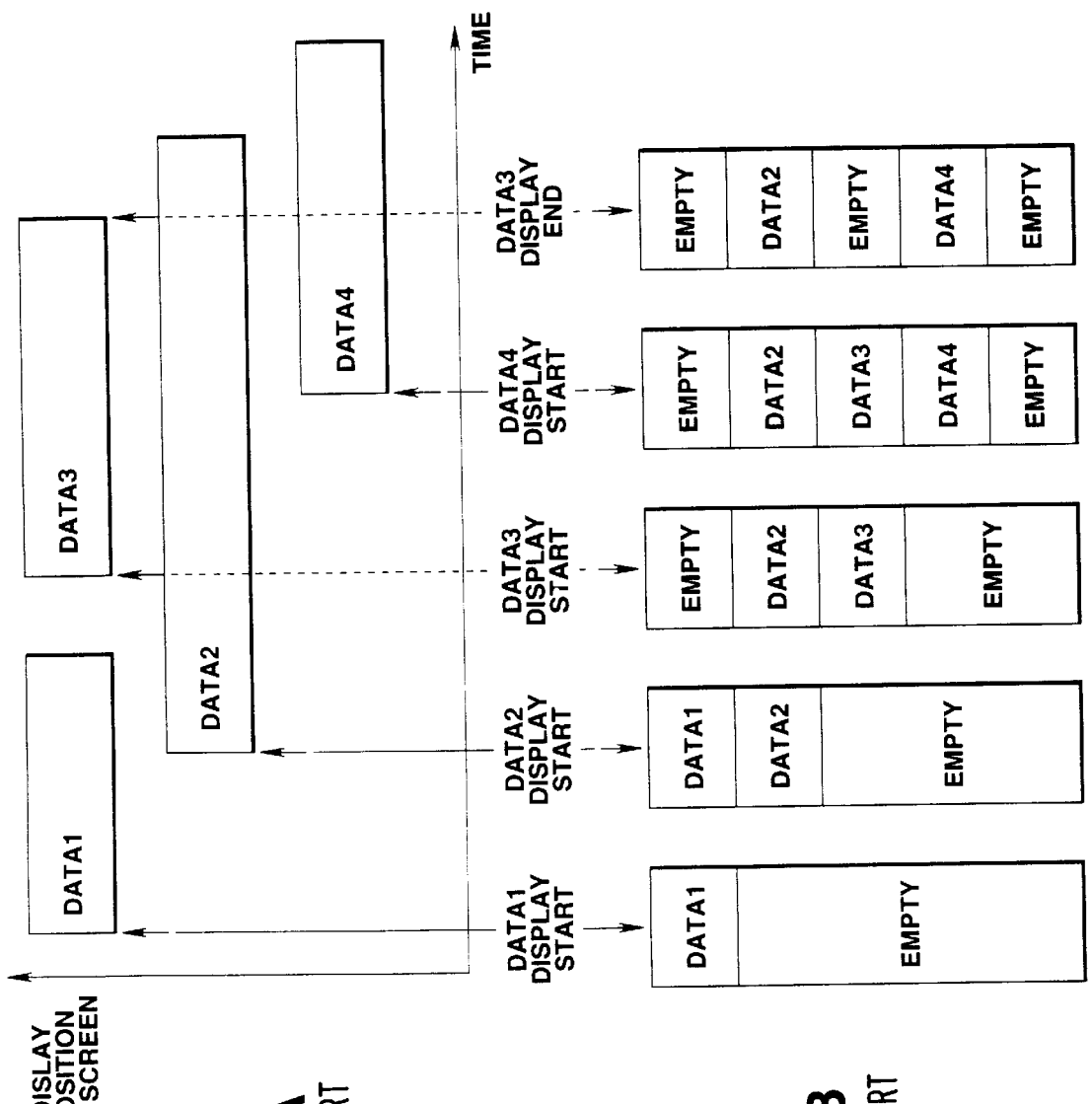
FIGS. 6A and 6B schematically illustrate the time and position at which four subtitles are displayed on a video image and the storage thereof in a buffer memory.

When the two subtitles DATA 1 and DATA 2 are stored in buffer memory 104, as previously discussed, address controller 110 for each frame processes node 2 and then processes node 1, and for each node controls the buffer memory to read out the respective subtitle when the system clock represents a time between the display start and end times of that subtitle. Assuming that display start time t1 occurs before display start time t2, and that time t2 occurs before display end time t1', and that time t1' occurs before display end time t2' (see FIG. 4), when the system clock represents a time between time t1 and time t2, the second subtitle DATA 2 is not read from buffer memory 104 when the second node is processed, but the first subtitle DATA 1 is reproduced, decoded and output from the subtitle decoding apparatus of the present invention when the first node is processed and, thus, only the first subtitle is superimposed on the video image between times t1 and t2. When the system clock represents a time between time t2 and t1', the second subtitle is read from buffer memory 104, decoded and superimposed on the video image and the first subtitle DATA 1 is read from buffer memory 104, decoded and superimposed on the video image. When the system clock represents a time between time t1' and time t2', only the second subtitle is read from buffer memory 104, decoded and superimposed on the video image. In addition, at display end time t1', the first subtitle is erased from buffer memory 104 (to be discussed) and the first node corresponding to the first subtitle is erased from the address list, and the pointers of each of the remaining nodes in the address list are re-established, such as shown in FIG. 11C. Only the second subtitle now is stored in buffer memory 104, and, therefore, the initial pointer points to the second node and the pointer of the second node points to the end pointer.

The operation of the subtitle decoding apparatus of the present invention when four subtitles are supplied with the video signal will now be discussed with reference to FIGS. 12A and 12B. As shown in FIG. 12A, the first subtitle DATA 1 is supplied to and stored in buffer memory 104. FIG. 12B illustrates the data structure of buffer memory 104, wherein the first subtitle DATA 1 is stored at a beginning memory location therein. At this time, an address list is generated in address controller 110 which includes a first node corresponding to the first subtitle DATA 1, and at the display start time of the first subtitle, the first subtitle is superimposed on the video image. The second subtitle DATA 2 subsequently is supplied to and stored in buffer memory 104, and a second node corresponding to the second subtitle is added to the address list, wherein the pointer of the first node points to the second node since the second subtitle positionally occurs after the first subtitle in the video image. Then, both the first and second subtitles are superimposed on the video image at the display start time of the second subtitle. When the display end time t1' of the first subtitle is reached (not shown in FIG. 12B), the first subtitle DATA 1 is erased from buffer memory 104 and the first node is removed from the address list, and the initial pointer is set to point to the second node of the address list.

When a third subtitle DATA 3 is supplied to buffer memory 104, it is stored immediately after the second subtitle therein, and a third node corresponding to the third subtitle is added to the address list. Also, and as previously discussed, the pointers of each of the nodes (i.e., nodes 2 and 3) are established such that the initial pointer points to the third node and the pointer of the third node points to the second node. When the display start time t3 of the third subtitle is reached, both the third and second subtitles are superimposed on the video image.

When a fourth subtitle DATA 4 is supplied to buffer memory 104, it is stored after the third subtitle therein and a fourth node is added to the address list. Further, since the fourth subtitle positionally occurs after the second subtitle in the video image, the pointer of the second node is established to point to the fourth node, and the pointer of the fourth node is established to point to the end pointer. When the display start time t4 of the fourth subtitle is reached, the third, second and fourth subtitles each are read from buffer memory 104 (in this order), decoded and superimposed on the video image.

As shown in FIGS. 12A and 12B, at the display end time t3' of the third subtitle, the superimposition of the third subtitle on the display is terminated, but the third subtitle is not erased from buffer memory 104 and the third node is not removed from the address list for reasons to be discussed. When the display end time t2' of the second subtitle is reached, both the second and third subtitles are erased from buffer memory 104 and the second and third nodes are removed from the address list, as shown in FIG. 12B. Then, since only the fourth subtitle is stored in buffer memory 104, the initial pointer is established to point to the fourth node. Finally, when the display end time t4' of the fourth subtitle is reached, the fourth subtitle is removed from buffer memory 104 and the fourth node is removed from the address list (not shown in FIG. 12B).

As mentioned above, when the display end time t3' of the third subtitle is reached, the third subtitle is not erased from buffer memory 104 and the third node is not removed from the address list. In accordance with the present invention, when subtitle data exists in buffer memory 104 which precedes a "current" subtitle which superimposition thereof on a video image has just been terminated, the "current" subtitle is not removed from memory and the node corresponding to the "current" subtitle is not removed from the address list. The present invention seeks to operate buffer memory 104 as a FIFO type memory device which provides several advantageous features to the present invention. For example, overflow or underflow of data in the buffer is prevented by the aforementioned operation since a signal representing the amount of unused memory in the buffer memory (produced thereby) represents a true value of useable space that is available for other subtitle data. As another example, leaving the above-discussed subtitle data in buffer memory 104 even after the termination of the display of the subtitle simplifies the control of the buffer memory.

Thus, and in accordance with the present invention, a subtitle is erased from buffer memory 104 upon termination of the display thereof if no data precedes that subtitle in memory. In addition, if data (i.e., subtitle data) exists that precedes the subtitle (which display thereof is terminated) represents a subtitle (or subtitles) which display thereof already is terminated, then both of these subtitles are erased from buffer memory 104 and the nodes corresponding thereto are removed from the address list. The cases in which subtitle data is erased or is not erased from buffer memory 104 is further described below with reference to FIGS. 14–17.

Figure 13:
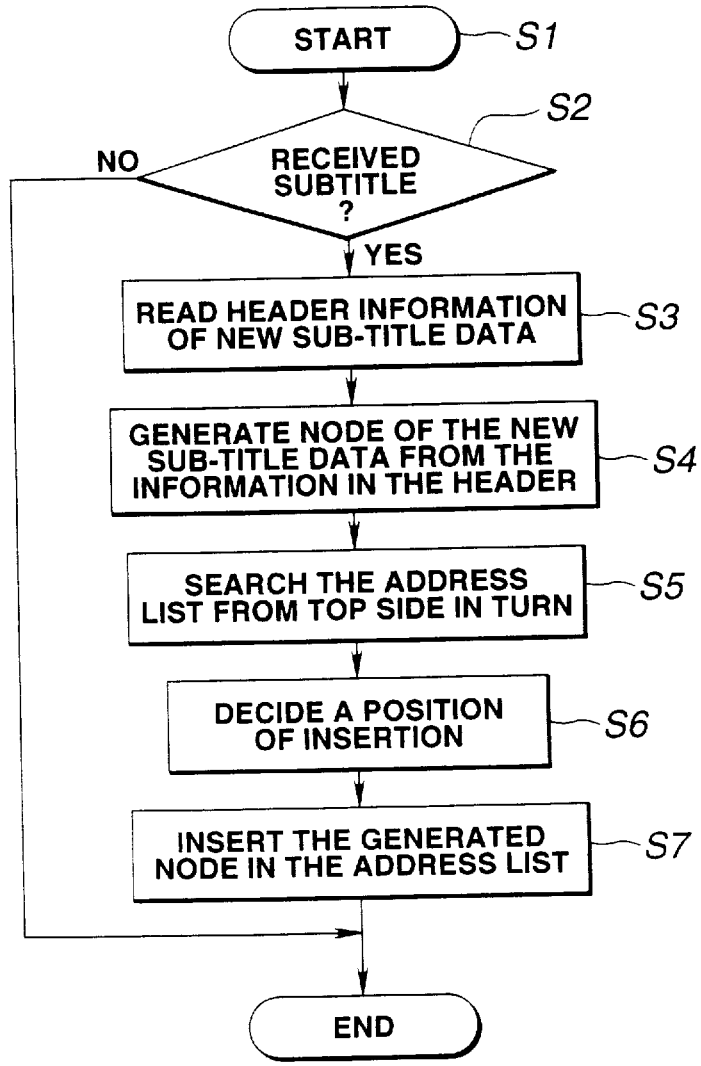
FIG. 13 is a flow chart of the operation of the address controllers of the present invention when a new subtitle is received.

FIG. 13 is a flow chart of the operation of both address controller 84 of subtitle coding apparatus 76 (FIG. 7) and address controller 110 of subtitle decoding apparatus 102 (FIG. 8) when one or more subtitles are supplied thereto. The operation begins at instruction S1 and, at inquiry S2, it is determined whether a new subtitle is received. In the subtitle coding apparatus 76, a new subtitle is received when it is provided to coder 78, and in subtitle decoding apparatus 102, it is determined that a subtitle is received when demultiplexer 94 supplies an appropriate control signal to address controller 110 which indicates the receipt of a new subtitle. If a new subtitle is not received, then the operation is terminated, but if a subtitle is received, header information of the newly received subtitle data is read therefrom at instruction S3, such header information including the start and end time data, as well as the display start and end position data of the supplied subtitle. A new data node is generated from the header information at instruction S4 and, at instruction S5, the position data of each node in the address list is read and, at instruction S6, it is decided where in the address list the new node is to be inserted depending on the respective values of the position data of each of the nodes. The node is inserted at the appropriate location in the address list at instruction S7 and the operation is terminated. Although the operation of both address controllers has been described with reference to the flow chart of FIG. 13 as inserting a node at the appropriate location in the address list, the node also may be added to the end of the address list wherein the pointer of each of the nodes is modified in accordance with the position of each of the subtitles, as previously discussed.

Figure 14:
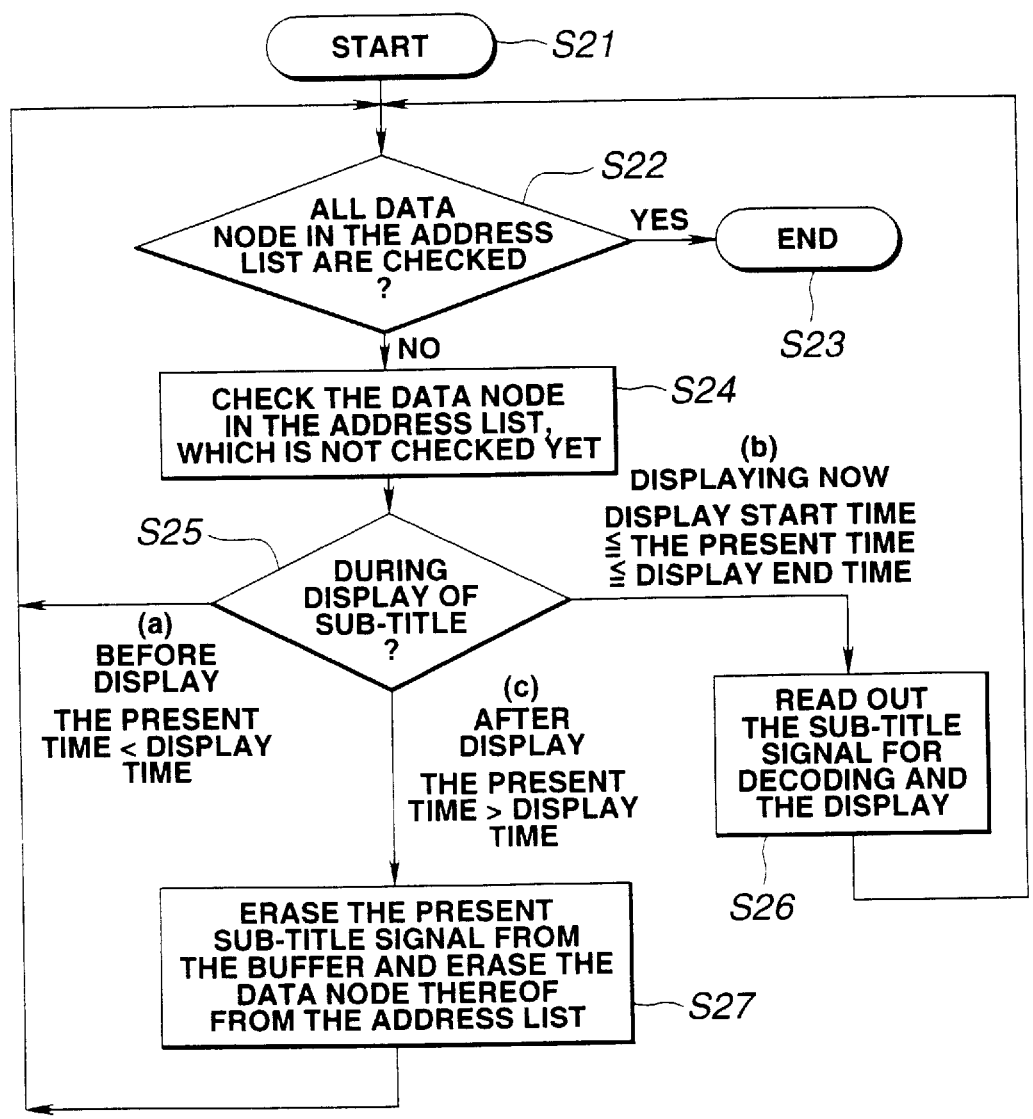
FIG. 14 is a flow chart of a decoding operation when two subtitles are supplied in accordance with the present invention.
Figure 15A:
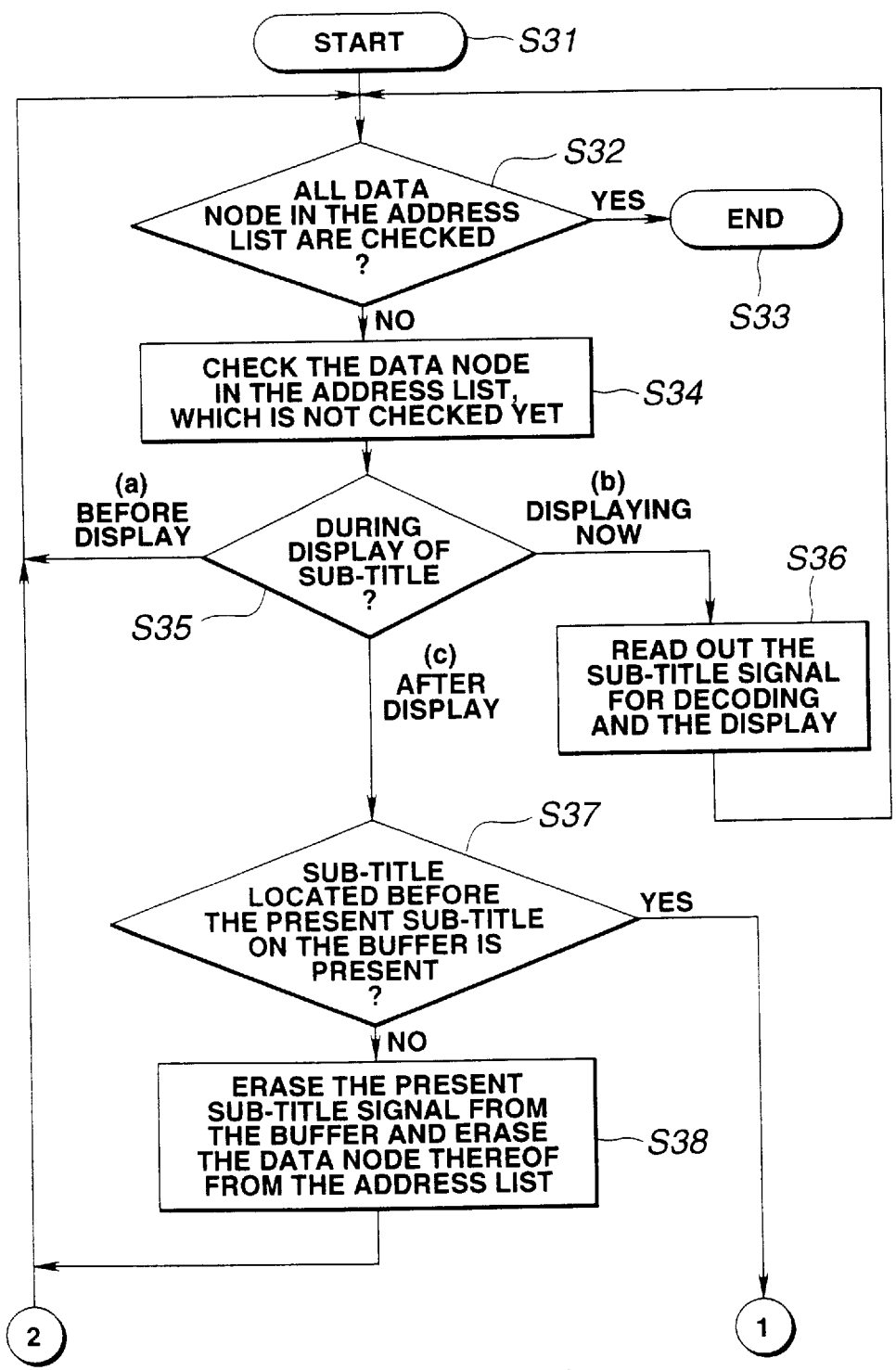
FIGS. 15A and 15B are flow charts illustrating the decoding operation of the present invention when three or more subtitles are supplied.
Figure 15B:
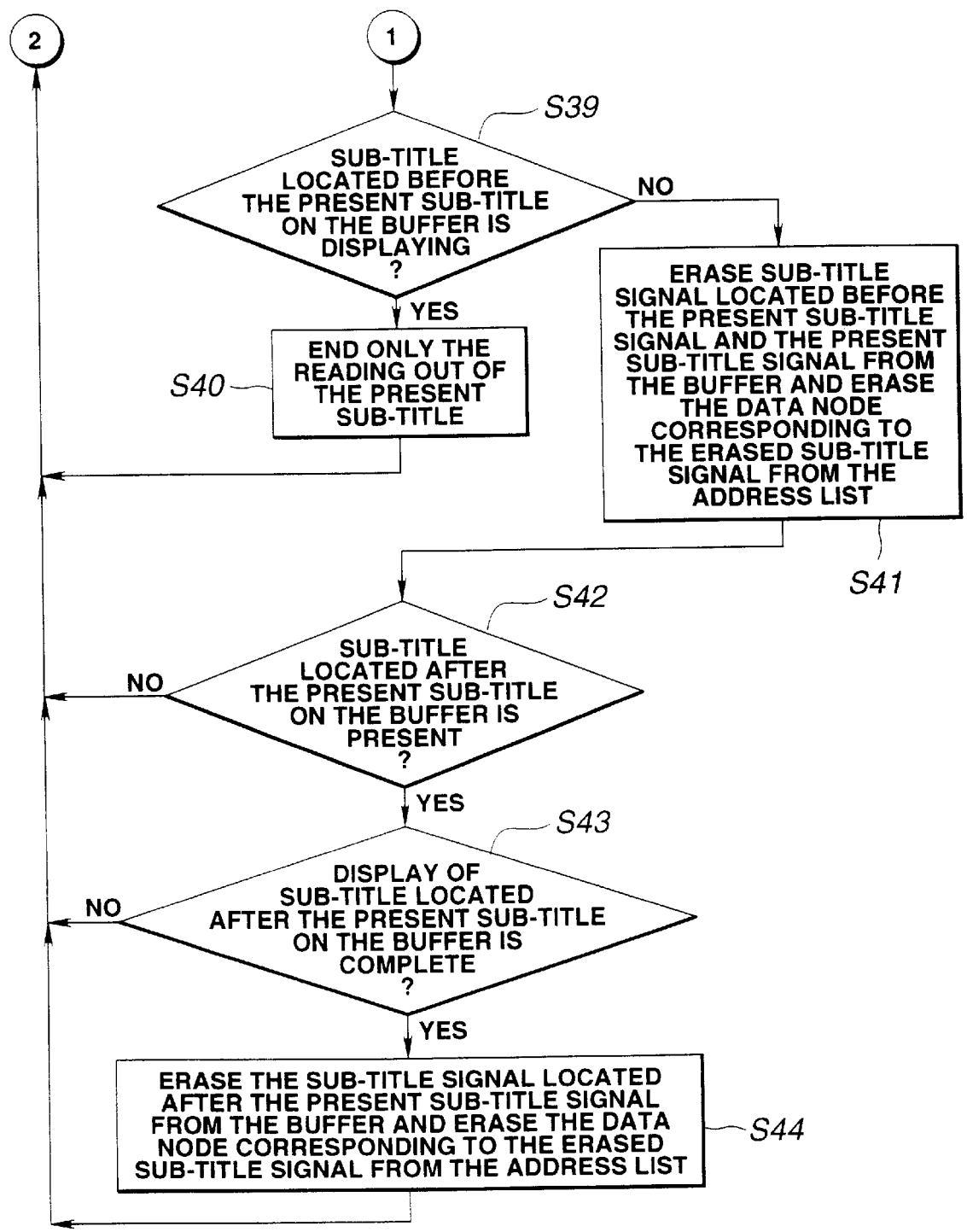

FIG. 14 is a flow chart of the operation of address controller 110 of subtitle decoding apparatus 102 when two subtitles are supplied subtitle decoding apparatus 102, and FIGS. 15A and 15B represent a flow chart of the operation of address controller 110 when three or more subtitles are supplied to subtitle decoding apparatus 102. Referring first to FIG. 14, after two subtitles have been stored in buffer memory 104 and two nodes representing the two subtitles are provided as the address list, the process begins at instruction S21 and, at inquiry S22, it is determined whether each and every node in the address list has been processed for a video image (i.e., field or frame) of the video picture. If so, the operation is terminated at instruction S23, but, if not, the next node (i.e., the first node or the second node) is read from the address list in the order specified by the pointers, previously discussed, at instruction S24.

The status of the display of the subtitle of the currently processed node (herein, called the "current" subtitle) is determined at inquiry S25. If the present time, as indicated by the system clock, is before the display start time of the current subtitle, then the operation proceeds back to instruction S22 at which point the next node is processed. If, however, it is determined that the current subtitle is to be displayed, as when the system clock is between the start and end times of the current subtitle, then, at instruction S26, the subtitle is read from buffer memory 104 from a location therein as indicated by the start and end addresses of the node, and the read-out subtitle data is decoded and displayed (i.e., superimposed on the video image). However, if it is determined that the display of the subtitle is terminated, as when the display end time is reached, the subtitle is erased from buffer memory 74 and the current node is removed from the address list at instruction S27. The operation of address controller 110 then proceeds back to inquiry S22.

As previously discussed, when a node is removed from the address list, the pointers of each of the remaining nodes in the address list are re-established in the manner previously discussed.

The operation of address controller 110 when three or more subtitles are supplied to the subtitle decoding apparatus of the present invention is shown in FIGS. 15A–15B, wherein for each video image (frame), the process begins at instruction S31 and, at inquiry S32, it is determined whether all of the data nodes in the address list have been processed. If so, the process of FIGS. 15A–15B is terminated at instruction S33. But, if not, the next node in the address list (starting with the node pointed to by the initial pointer) is read from memory 112 at instruction S34. Similar to inquiry S25 (FIG. 14), the status of the subtitle of the current node is determined at inquiry S35, and if it is determined that the subtitle is not yet to be displayed, then the process proceeds back to inquiry S32. However, if it is determined that the current subtitle is to be displayed, then the subtitle is read from buffer memory 104, decoded and displayed (i.e., superimposed on the video image) at instruction S36, and the process then proceeds back to inquiry S32.

If it is determined at inquiry S35 that the display of the current subtitle is or already is terminated, then the process proceeds to inquiry S37 whereat it is determined if any subtitle data exists before the current subtitle in buffer memory 104. If no data precedes the current subtitle in buffer memory 104, then the current subtitle is erased from buffer memory 104 and the current node is removed from the address list at instruction S38, and the process proceeds back to inquiry S32. However, if data exists before the currently processed subtitle in buffer memory 74, then it is determined, at inquiry S39 (FIG. 15B) if the subtitle that precedes the current subtitle in buffer memory 104 is currently being displayed. If so, the current subtitle is not read from buffer memory 104 (i.e., not displayed, but also not removed from memory) and the process proceeds back to inquiry S32. However, if the subtitle that precedes the current subtitle is not being displayed anymore (i.e., the system clock has exceeded the display end time of the preceding subtitle), then both the preceding and current subtitles are erased from buffer memory 104 and the nodes corresponding to the preceeding and current subtitles are removed from the address list at instruction S41. Then, at inquiry S42, it is determined if a subtitle exists after the current subtitle (which has just been erased) in buffer memory 104. If so, the process proceeds to inquiry S43, but, if not, the process proceeds back to inquiry S32. At inquiry S43, it is determined if the display of the succeeding subtitle is terminated, as indicated by time data of the node of the successive subtitle. If so, then the successive subtitle is erased from buffer memory 104 and the node corresponding to that subtitle is removed from the address list at instruction S44. Then, or if the display of the successive subtitle is not terminated, the process proceeds back to inquiry S32.

Figure 16:
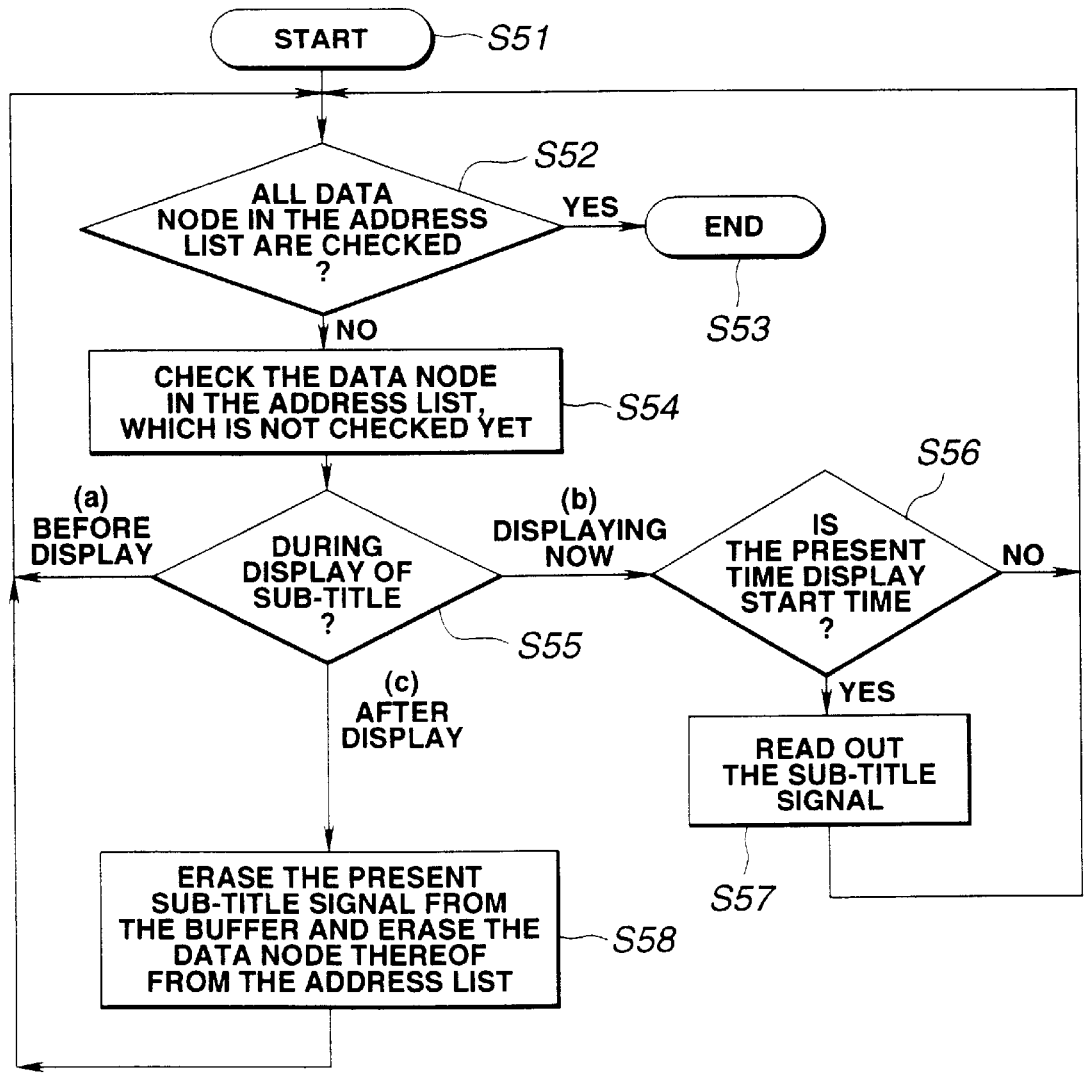
FIG. 16 is a flow chart of an encoding operation when two subtitles are supplied in accordance with the present invention.

FIG. 16 is a flow chart of the operation of address controller 84 of subtitle coding apparatus 76 when two subtitles are supplied thereto. The flow chart of FIG. 16 is substantially similar to the flow chart of FIG. 14, which represents the operation of address controller 110 of subtitle decoding apparatus 102 when two subtitles are supplied, in that inquiry S52, instructions S53–S54, inquiry S55 and instruction 58 are the same as inquiry S22, instructions S23–S24, inquiry S25 and instruction S27, respectively. Therefore, a description thereof is omitted herein. However, when address controller 84, at inquiry S55, determines that a currently processed subtitle (i.e., node) is to currently displayed, then it is determined at inquiry S56, if the current time, as indicated by the system clock signal, represents the display start time of the current subtitle. If so, the subtitle is read from buffer memory 82 and subsequently multiplexed with the video image for recording or transmission thereof. If not, the process proceeds back to inquiry S52. Thus, address controller 84 operates to control buffer memory 82 in subtitle coding apparatus 76 to supply a subtitle for multiplexing with the video signal at the time when that subtitle is to be superimposed on the video image.

Figure 17A:
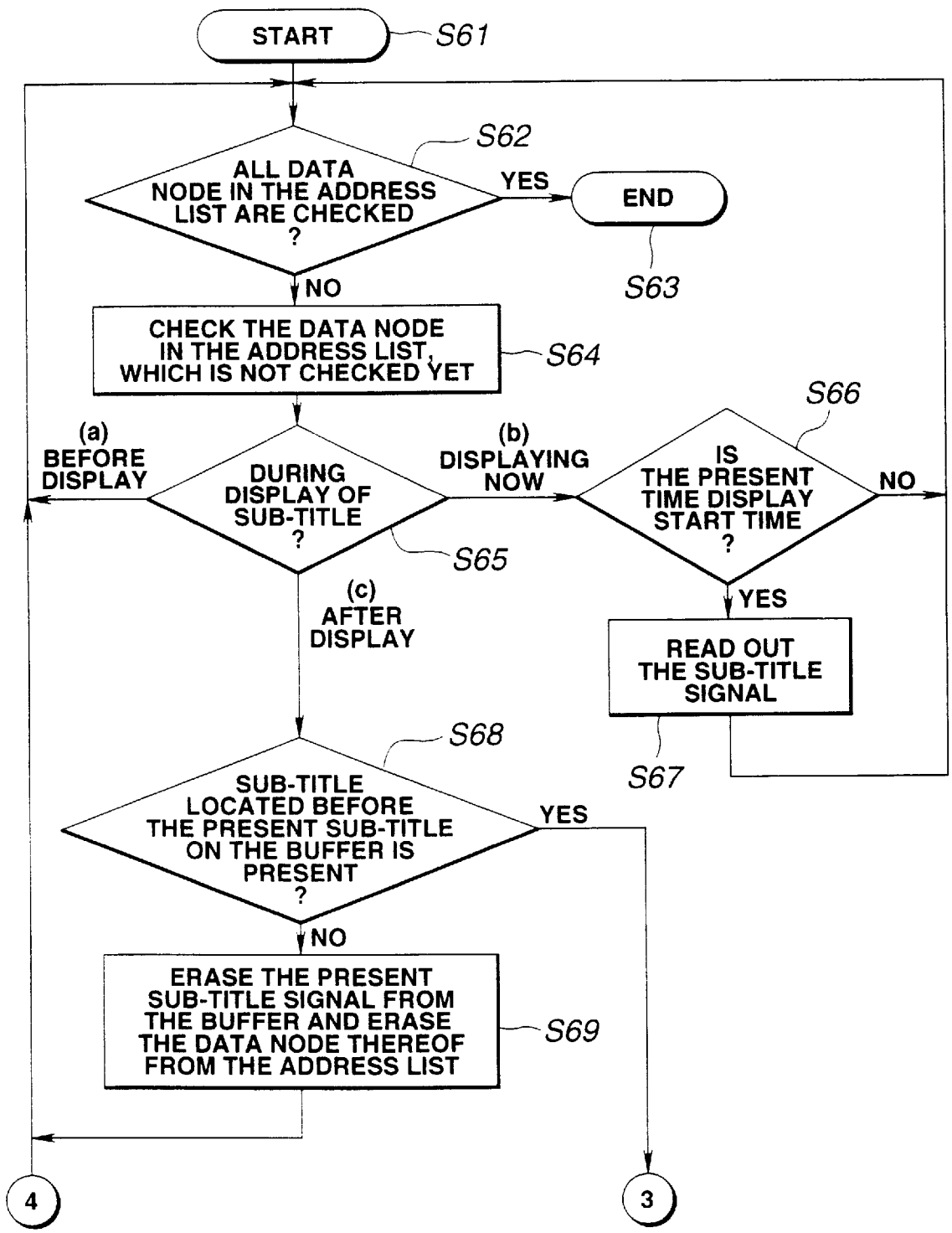
FIGS. 17A and 17B are flow charts illustrating the encoding operation of the present invention when three or more subtitles are supplied.
Figure 17B:
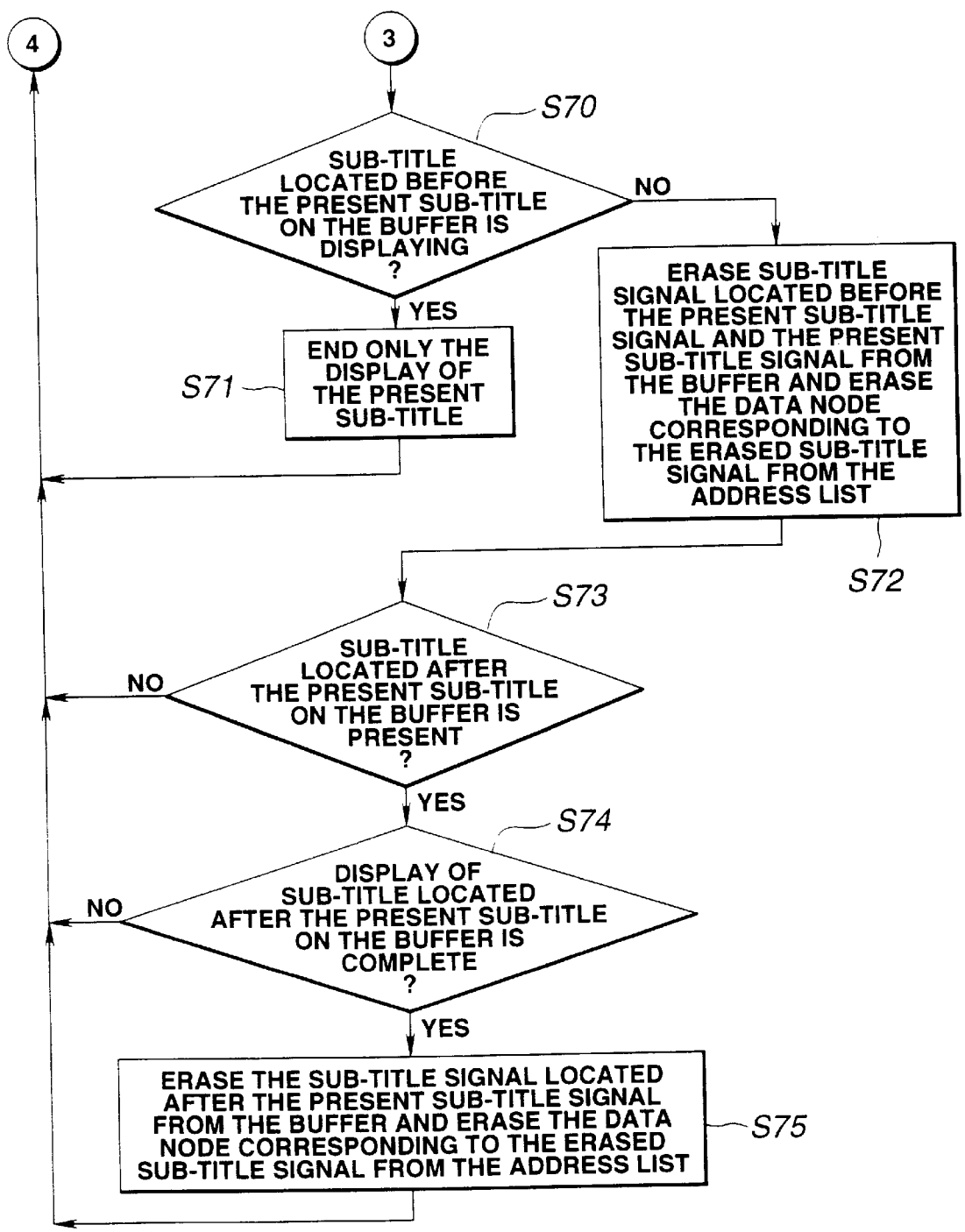

Referring next to FIGS. 17A and 17B, a flow chart of the operation of address controller 84 when three or more subtitles are provided is shown. The flow chart of FIGS. 17A–17B is substantially the same as the flow chart of FIGS. 15A–15B and, thus, a description of those instructions and inquiries that are the same therein are omitted herein. However, in the flow chart of FIGS. 17A–17B, when it is determined at inquiry S65 that a current subtitle is to be displayed, the process proceeds to inquiry S66 at which time it is determined whether the current time, as indicated by the system clock signal, is equal to the display start time of the subtitle. If so, the current subtitle is read from buffer memory 82 in a manner similar to that discussed above with reference to the flow chart of FIG. 16. If not, the process proceeds to inquiry S62. In addition, it is determined, at inquiry S70, if the preceeding subtitle in buffer memory 82 is being displayed, and if so, the current subtitle is not displayed (and not erase from memory), at instruction S71.

From the above discussion, it is seen that both buffer memories 82 and 104 are controlled to operate as first-in-first-out memory devices so that the control thereof may be simplified and, further, so as to prevent the underflow/overflow of data therein. By using an address list which includes nodes which each corresponds to a respective subtitle stored in the buffer memories, and by providing in each node various subtitle data including the display start and end time data, the display start and end position data, and the start and end addresses at which the subtitle data is stored, as well as a pointer which points to a successive subtitle that is to be displayed positionally on the video image, allows for the simplified processing and control of a multiple number of subtitles.

While the present invention has been particularly shown and described in conjunction with preferred embodiments thereof, it will be readily appreciated by those of ordinary skill in the art that various changes may be made without departing from the spirit and the scope of the invention. For example, although the specific block structure of the subtitle coding and decoding apparatus has been shown and described, the present invention is not limited to this specific block structure and may be applied to other types of block structures and circuits which involve the superimposition or display of subtitles or other video data.

Therefore, it is intended that the appended claims be interpreted as including the embodiments described herein, the alternatives mentioned above, and all equivalents thereto.

What is claimed is:

1. Apparatus for coding a subtitle signal, comprising:
   means for receiving a subtitle signal representing a subtitle to be superimposed on a video image, said subtitle signal including display time data representing a time at which said subtitle is to be superimposed and display position data representing a location in said video image at which said subtitle is to be superimposed;
   encoding means for encoding the received subtitle signal to produce a coded subtitle signal;
   storage means for temporarily storing the coded subtitle signal in accordance with a write address signal and for reading out the stored coded subtitle signal in accordance with a read address signal;
   storage control means for generating an address list from said display time data and said display position data and for generating said read address signal and said write address signal in accordance with the generated address list; and
   means for supplying as an output signal the coded subtitle signal read from said storage means.

2. The apparatus of claim 1, wherein said storage control means is operable to add a data node to said address list each time a subtitle signal representing a respective subtitle is received, said data node including data corresponding to said display time data and said display position data included in said subtitle signal, said data node further including memory location data representing a location in said storage means at which said coded subtitle signal is stored.

3. The apparatus of claim 2, wherein each data node in said address list further includes respective pointer data identifying another data node in said address list corresponding to a subtitle to be superimposed positionally after the subtitle corresponding to the respective data node.

4. The apparatus of claim 3, wherein said storage control means is operable to generate read address signals corresponding to the coded subtitles that are to be read from the storage control means in an order as indicated by the respective pointer data of each said data node in said address list.

5. The apparatus of claim 3, wherein said storage control means includes means for determining, for each data node stored in the address list in an order as indicated by the respective pointer data of each said data node, whether a respective coded subtitle signal stored in said storage means is to be output as a function of a system clock time and the respective display time data included in the respective data node; and for generating read address signals corresponding only to the respective coded subtitle signal that has been determined to be output.

6. The apparatus of claim 1, wherein said storage control means is operable to generate appropriate write address signals such that successively received and coded subtitle signals representing respective subtitles are stored in successive locations in said storage means, said storage control means being further operable to generate appropriate read address signals such that selected coded subtitle signals in accordance with their respective display time data are read from said storage means; and said storage control means being further operable to remove from said storage means a coded subtitle signal having respective display time data representing an end time that is earlier than a current time only if there is no coded subtitle signals preceding said respective coded subtitle signal in said storage means.

7. The apparatus of claim 1, wherein the storage control means generates said read address signal and said write address signal such that said storage means operates as a first-in-first-out memory.

8. Apparatus for decoding a coded subtitle signal, comprising:
   means for receiving a coded subtitle signal representing a subtitle to be superimposed on a video image, said coded subtitle signal including display time data representing a time at which said subtitle is to be superimposed and display position data representing a location in said video image at which said subtitle is to be superimposed;
   storage means for temporarily storing the coded subtitle signal in accordance with a write address signal and for reading out the stored coded subtitle signal in accordance with a read address signal;

storage control means for generating an address list from said display time data and said display position data and for generating said read address signal and said write address signal in accordance with the generated address list; and decoding means for decoding the read out coded subtitle signal to produce a decoded subtitle signal.

9. The apparatus of claim 8, wherein said storage control means is operable to add a data node to said address list each time a coded subtitle signal representing a respective subtitle is received, said data node including data corresponding to said display time data and said display position data included in said coded subtitle signal, said data node further including memory location data representing a location in said storage means at which said coded subtitle signal is stored.

10. The apparatus of claim 9, wherein each data node in said address list further includes respective pointer data identifying another data node in said address list corresponding to a subtitle to be superimposed positionally after the subtitle corresponding to the respective data node.

11. The apparatus of claim 10, wherein said storage control means is operable to generate read address signals corresponding to those subtitles that are to be decoded and output for subsequent superimposition on a video image in an order as indicated by the respective pointer data of each said data node in said address list.

12. The apparatus of claim 10, wherein said storage control means includes means for determining, for each data node stored in the address list in an order as indicated by the respective pointer data of each said data node, whether a respective subtitle signal stored in said storage means is to be output as a function of a system clock time and the respective display time data included in the respective data node; and for generating read address signals corresponding only to the respective subtitle signal that has been determined to be output.

13. The apparatus of claim 8, wherein said storage control means is operable to generate appropriate write address signals such that successively received coded subtitle signals representing respective subtitles are stored in successive locations in said storage means, said storage control means being further operable to generate appropriate read address signals such that selected coded subtitle signals in accordance with their respective display time data are read from said storage means; and said storage control means being further operable to remove from said storage means a coded subtitle signal having respective display time data representing an end time that is earlier than a current time only if there is no coded subtitle signals preceding said respective coded subtitle signal in said storage means.

14. The apparatus of claim 8, wherein the storage control means generates said read address signal and said write address signal such that said storage means operates as a first-in-first-out memory.

15. Method of coding a subtitle signal, comprising the steps of:

receiving a subtitle signal representing a subtitle to be superimposed on a video image, the subtitle signal including display time data representing a time at which the subtitle is to be superimposed and display position data representing a location in the video image at which the subtitle is to be superimposed;

encoding the received subtitle signal to produce a coded subtitle signal;

generating an address list from the display time data and the display position data;

generating a write address signal;

generating a read address signal in accordance with the generated address list;

storing the coded subtitle signal in a memory in accordance with the write address signal;

reading the stored coded subtitle signal from the memory in accordance with the read address signal; and supplying as an output signal the coded subtitle signal read from the memory.

16. The method of claim 15, further comprising the step of adding a data node to the address list each time a subtitle signal representing a respective subtitle is received, each said data node including data corresponding to the display time data and the display position data included in the respective subtitle signal, each said data node further including memory location data representing a location in the memory at which the respective coded subtitle signal is stored.

17. The method of claim 16, wherein each said data node in the address list further includes respective pointer data identifying another one of said data nodes in the address list corresponding to a subtitle to be superimposed positionally after the subtitle corresponding to the respective data node.

18. The method of claim 17, wherein said step of generating a read address signal is carried out by generating a read address signal corresponding each coded subtitle that is to be read from the memory in an order as indicated by the respective pointer data of each said data node in the address list.

19. The method of claim 17, wherein said step of generating a read address signal is carried out by determining, for each data node stored in the address list in an order as indicated by the respective pointer data of each said data node, whether a respective coded subtitle signal stored in the memory is to be output as a function of a system clock time and the respective display time data included in the respective data node and generating a read address signal corresponding only to each respective coded subtitle signal that has been determined to be output.

20. The method of claim 15, wherein said step of generating a write address signal is carried out by generating appropriate write address signals such that successively received and coded subtitle signals representing respective subtitles are stored in successive locations in the memory; and said step of generating a read address signal is carried out by generating appropriate read address signals such that selected coded subtitle signals in accordance with their respective display time data are read from the memory; said method further comprising the step of removing from the memory a stored coded subtitle signal having respective display time data representing an end time that is earlier than a current time only if there is no coded subtitle signals preceding the respective coded subtitle signal in the memory.

21. Method of decoding a coded subtitle signal, comprising the steps of:

receiving a coded subtitle signal representing a subtitle to be superimposed on a video image, the coded subtitle signal including display time data representing a time at which the subtitle is to be superimposed and display position data representing a location in the video image at which the subtitle is to be superimposed;

generating an address list from the display time data and the display position data;

generating a write address signal;

generating a read address signal in accordance with the generated address list;

storing the coded subtitle signal in a memory in accordance with the write address signal;

reading the stored coded subtitle signal from the memory in accordance with the read address signal; and decoding the read out coded subtitle signal to produce a decoded subtitle signal.

22. The method of claim 21, further comprising the step of adding a data node to the address list each time a coded subtitle signal representing a respective subtitle is received, each said data node including data corresponding to the display time data and the display position data included in the respective coded subtitle signal, said data node further including memory location data representing a location in the memory at which the respective coded subtitle signal is stored.

23. The method of claim 22, wherein each said data node in the address list further includes respective pointer data identifying another one of said data nodes in the address list corresponding to a subtitle to be superimposed positionally after the subtitle corresponding to the respective data node.

24. The method of claim 23, wherein said step of generating a read address signal is carried out by generating a read address signal corresponding to each coded subtitle that is to be decoded and output for subsequent superimposition on a video image in an order as indicated by the respective pointer data of each said data node in the address list.

25. The method of claim 23, wherein said step of generating a read address signal is carried out by determining, for each data node stored in the address list in an order as indicated by the respective pointer data of each said data node, whether a respective subtitle signal stored in the memory is to be output as a function of a system clock time and the respective display time data included in the respective data node and generating a read address signal corresponding only to each respective subtitle signal that has been determined to be output.

26. The method of claim 21, wherein said step of generating a write address signal is carried out by generating appropriate write address signals such that successively received coded subtitle signals representing respective subtitles are stored in successive locations in the memory; and said step of generating a read address signal is carried out by generating appropriate read address signals such that selected coded subtitle signals in accordance with their respective display time data are read from the memory; said method further comprising the step of removing from the memory a coded subtitle signal having respective display time data representing an end time that is earlier than a current time only if there is no coded subtitle signals preceding the respective coded subtitle signal in the memory.

\* \* \* \* \*